US008040381B2

(12) United States Patent (10) Patent No.: US 8,040,381 B2
Yumiki et al. (45) Date of Patent: Oct. 18, 2011

(54) IMAGE BLUR CORRECTION FOR A CAMERA SYSTEM AND DISPLAY OF COMPARISON OF CAMERA AND LENS BLUR CORRECTION SPECIFICATIONS

(75) Inventors: Naoto Yumiki, Osaka (JP); Kenichi Honjo, Osaka (JP); Kazuhiko Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 559 days.

(21) Appl. No.: 12/096,101

(22) PCT Filed: Dec. 1, 2006

(86) PCT No.: PCT/JP2006/324110
§ 371 (c)(1),
(2), (4) Date: Jun. 4, 2008

(87) PCT Pub. No.: WO2007/077705
PCT Pub. Date: Jul. 12, 2007

(65) Prior Publication Data
US 2009/0160956 A1 Jun. 25, 2009

(30) Foreign Application Priority Data

Dec. 7, 2005 (JP) .................................. 2005-352966
Jul. 14, 2006 (JP) .................................. 2006-194132

(51) Int. Cl.
*H04N 5/228* (2006.01)
(52) U.S. Cl. .................... 348/208.5; 348/208.15; 396/52
(58) Field of Classification Search ............. 348/208.99, 348/208.1–208.11, 333.02; 396/52–55
See application file for complete search history.

(56) References Cited

U.S. PATENT DOCUMENTS
2005/0140793 A1 6/2005 Kojima et al.

FOREIGN PATENT DOCUMENTS

| JP | 10-73860 | 3/1998 |
|---|---|---|
| JP | 11-101998 | 4/1999 |
| JP | 2002-107787 | 4/2002 |
| JP | 2004-191647 | 7/2004 |
| JP | 2005-128092 | 5/2005 |
| JP | 2005-189654 | 7/2005 |
| JP | 2007-25298 | 2/2007 |

OTHER PUBLICATIONS

Machine English Translation of JP 11-101998 (Apr. 13, 1999).*
Machine English Translation of JP 2002-107787 (Apr. 10, 2002).*

* cited by examiner

*Primary Examiner* — Nelson D. Hernández Hernández
(74) *Attorney, Agent, or Firm* — McDermott Will & Emery LLP

(57) ABSTRACT

There are provided a camera system which operates the proper image blur corrector when image blur correction devices are incorporated in a camera body and in an interchangeable lens, and a method for controlling this camera system. The camera system (1) includes the camera body (3) and the interchangeable lens (2), which is removably attachable to the camera body (3). The camera body (3) has an imaging unit (71), the body image blur corrector (75), and a body microprocessor (12) configured to control the operation of the imaging unit (71) and the body image blur corrector (75). The interchangeable lens (2) has the lens image blur corrector (82) and a lens microprocessor (20) configured to control the operation of the lens image blur corrector (82). The body microcomputer (12) selects either the body or lens image blur corrector (75 or 82), sets the selected image blur corrector to a correction enabled state, and sets the other image blur corrector to a correction disabled state.

11 Claims, 14 Drawing Sheets

IMAGE BLUR CORRECTION FOR A CAMERA SYSTEM AND DISPLAY OF COMPARISON OF CAMERA AND LENS BLUR CORRECTION SPECIFICATIONS

RELATED APPLICATIONS

This application is the U.S. National Phase under 35 U.S.C. §371 of International Application No. PCT/JP2006/324110, filed on Dec. 1, 2006, which in turn claims the benefit of Japanese Application No. 2005-352966, filed on Dec. 7, 2005 and Japanese Application No. 2006-194132, filed on Jul. 14, 2006, the disclosures of which Applications are incorporated by reference herein.

FIELD OF THE INVENTION

The present invention relates to a camera system and a method for controlling the same, and more particularly relates to a camera system for a single-reflex digital camera with image blur correctors built into an interchangeable lens and the camera body, and to a method for controlling this system.

BACKGROUND ART

Single-reflex digital cameras with which an optical image of a subject is converted into an electrical image signal and can be outputted are rapidly growing in popularity. With a single-reflex digital camera such as this, the camera system is made up of a camera body and an interchangeable lens that is removably mounted on the camera body. With this camera system, the basic function of the camera body is to form images of subjects, and the interchangeable lens has the optical function of constituting part of the imaging optical system.

With this single-reflex digital camera, when the user looks at a subject through the viewfinder, the light that is incident on the interchangeable lens (that is, the subject image) is reflected by a reflecting mirror disposed along the optical path to the rear of the interchangeable lens, and is incident on a pentaprism. As a result, the subject image is converted by the pentaprism into an erect image, and the user can see the subject image through the optical viewfinder.

Also, with this single-reflex digital camera, since a plurality of interchangeable lenses of different focal length can be mounted on a single camera body, the user can photograph a wide variety of scenes using the interchangeable lens best suited to each scene.

Meanwhile, there has been a proposal for standards for a single-reflex camera system in which the communication system between the camera body and the interchangeable lens, the lens mount, and so forth are standardized in order to make such products more convenient to use. This would make these products interchangeable as long as the camera body and interchangeable lens met the standards, so a user could combine camera main bodies and interchangeable lenses made by different manufacturers.

Thus, these single-reflex digital cameras have become a system that is extremely convenient to use, which means that as these single-reflex digital cameras become more popular, they can be used not only by the professionals and experienced amateurs who used them in the past, but also by beginners and so forth.

Nevertheless, even with a single-reflex digital camera, just as with ordinary digital cameras, hand shake often adversely affects the resulting photographic image. Therefore, as the number of pixels increases in the imaging sensors built into the camera body, and as the enlarged printing of these photographic images becomes more prevalent, for example, the effect of hand shake becomes more pronounced. The effect of hand shake is even more pronounced when the camera is used by a novice.

In view of this, a camera system has been proposed for a single-reflex digital camera, in which an optical image blur corrector for adjusting the optical path and thereby correcting image blur caused by hand shake is built into an interchangeable lens (see Patent Document 1, for example).

Patent Document 1: Japanese Laid-Open Patent Application H10-73860

DISCLOSURE OF THE INVENTION

One image blur corrector other than an optical type that has been proposed is a sensor shift type of image blur corrector, which shifts imaging sensors according to hand shake. With this sensor shift type of image blur corrector, an image blur correction effect can be obtained even when an interchangeable lens is attached that is not equipped with an optical image blur corrector. Therefore, it is conceivable that a sensor shift type of image blur corrector will be installed in the camera body of a single-reflex digital camera.

However, if image blur correctors are built into a camera body and an interchangeable lens, when the interchangeable lens is connected to the camera body, the two image blur correctors will operate at the same time and the image blur correction operation cannot be performed properly. Also, it may be impossible to communicate properly between an interchangeable lens and a camera body made by different manufacturers.

It is an object of the present invention to provide a camera system that operates image blur correctors properly when image blur correctors are built into a camera body and an interchangeable lens, and to provide a method for controlling a camera system, an interchangeable lens, and a camera body.

The camera system according to a first aspect of the present invention is a camera system for forming an image of a subject, comprising a camera body and an interchangeable lens that is removably attachable to the camera body. The camera body has an imaging unit configured to form an image of a subject, a body image blur corrector configured to detect shake of the camera system and correct blurring of an image caused by this shake, and a body controller configured to control the imaging operation of the imaging unit and also control the correcting operation of the body image blur corrector. The interchangeable lens has a lens image blur corrector configured to detect shake and correct image blur, and a lens controller configured to control the correcting operation of the lens image blur corrector. The body controller is capable of sending and receiving information to and from the lens controller, and has a select component configure to select either the body or lens image blur corrector, and a setting component configure to set the selected image blur corrector to a correction enabled state and setting the other image blur corrector to a correction disabled state.

With this camera system, one of the image blur correctors is set to a correction enabled state by the body controller, and the other image blur corrector is set to a correction disabled state. As a result, the image blur correctors can be operated properly even if they are installed in both the camera body and the interchangeable lens.

The term "correction enabled state" as used here means a state in which an image blur corrector can perform its correction operation. The term "correction disabled state" means a state in which an image blur corrector cannot perform its correction operation, and "correction disabled state" encompasses, for example, a state in which the correcting lens of an image blur corrector is mechanically fixed in its middle position, or a state in which the correcting lens is electrically supported in its middle position.

The camera system according to a second aspect of the present invention is the camera system of the first aspect of the present invention, wherein the body controller holds body information pertaining to the camera body, and the lens controller holds lens information pertaining to the interchangeable lens. The select component selects either the body or lens shake detector on the basis of the body information and lens information.

As a result, the image blur correctors can be selected according to their specifications, etc., and the performance of the image blur correctors can be maximized.

The camera system according to a third aspect of the present invention is the camera system of the second aspect of the present invention, wherein the body information includes body specifying information for specifying the model of the camera body, the lens information includes lens specifying information for specifying the model of the interchangeable lens, and the select component selects either the body or lens image blur corrector on the basis of the body specifying information and lens specifying information.

In this case, for example, the newer model of image blur corrector can be used, and the image blur correction performance of the camera system can be maximized.

The term "model" here means information that allows the hardware or software configuration to be identified, examples of which include the date of manufacture, the model number, the version, and firmware updates.

The camera system according to a fourth aspect of the present invention is the camera system of the second aspect of the present invention, wherein the body information includes body-side detection performance information pertaining to the detection performance of the body image blur corrector, and the lens information includes lens-side detection performance information pertaining to the detection performance of the lens image blur corrector. The select component selects either the body or lens image blur corrector on the basis of the body-side and lens-side detection performance information.

In this case, for example, the image blur corrector with better detection performance can be used, and the image blur correction performance of the camera system can be maximized.

An example of the "detection performance" here is the sensitivity of the shake detector.

The camera system according to a fifth aspect of the present invention is the camera system of the second aspect of the present invention, wherein the body information includes body-side correction performance information pertaining to the correction performance of the body image blur corrector, and the lens information includes lens-side correction performance information pertaining to the correction performance of the lens image blur corrector. The select component selects either the body or lens image blur corrector on the basis of the body-side and lens-side correction performance information.

In this case, for example, the image blur corrector with better correction performance can be used, and the image blur correction performance of the camera system can be maximized.

An example of the "correction performance" here is the maximum possible correction angle determined from an optical system such as a correcting lens.

The camera system according to a sixth aspect of the present invention is the camera system of the second aspect of the present invention, wherein the body information includes body-side power consumption information pertaining to the power consumption of the body image blur corrector, the lens information includes lens-side power consumption information pertaining to the power consumption of the lens image blur corrector, and the select component selects either the body or lens image blur corrector on the basis of the body-side and lens-side power consumption information.

In this case, the image blur corrector is selected on the basis of its power consumption. Therefore, for example, an image blur corrector with lower power consumption during imaging can be used, and the power consumption of the overall camera system can be reduced.

The camera system according to a seventh aspect of the present invention is the camera system of the second aspect of the present invention, wherein the body information includes body-side drive style information pertaining to the drive style of the body image blur corrector, and the lens information includes lens-side drive style information pertaining to the drive style of the lens image blur corrector. The select component selects either the body or lens image blur corrector on the basis of the body-side and lens-side drive style information.

In this case, the image blur corrector is selected on the basis of the drive style of the image blur corrector. For instance, when a piezoelectric actuator is used in the image blur corrector, because piezoelectric actuators operate very quietly, such an image blur corrector is suited to a photography mode that requires silent operation. Therefore, the optimal image blur corrector for the photography mode can be used by selecting an image blur corrector that makes use of a piezoelectric actuator.

The camera system according to a eighth aspect of the present invention is the camera system of the second aspect of the present invention, wherein, when it is determined from the body information and lens information that the body and lens image blur corrector specifications are the same, the select component selects the body or lens image blur corrector that has been predetermined in the body controller.

As a result, image blur correction is performed by only one image blur corrector even when the specifications are the same.

The camera system according to a ninth aspect of the present invention is the camera system of the second aspect of the present invention, wherein the body controller further has a detect component configured to detect that the interchangeable lens has been mounted in the camera body. The select component selects either the body or lens image blur corrector after detection by the detect component.

In this case, the image blur corrector is automatically selected after the interchangeable lens is mounted.

The camera system according to a tenth aspect of the present invention is the camera system of the second aspect of the present invention, wherein the body information includes at least one of the following: body specifying information for specifying the model of the camera body, body-side detection performance information pertaining to the detection performance of the body image blur corrector, body-side correction performance information pertaining to the correction performance of the body image blur corrector, body-side power consumption information pertaining to the power consumption of the body image blur corrector, and body-side drive style information pertaining to the drive style of the body image blur corrector.

The camera system according to a eleventh aspect of the present invention is the camera system of the second aspect of the present invention, wherein the lens information includes at least one of the following: lens specifying information for specifying the model of the interchangeable lens, lens-side detection performance information pertaining to the detection performance of the lens image blur corrector, lens-side correction performance information pertaining to the correction performance of the lens image blur corrector, lens-side power consumption information pertaining to the power consumption of the lens image blur corrector, and lens-side drive style information pertaining to the drive style of the lens image blur corrector.

The camera system according to a twelfth aspect of the present invention is the camera system of the first aspect of the present invention, further comprising an image blur correction selector provided to the camera body or the interchangeable lens, with which either the body or lens image blur corrector can be selected from the outside. The select component selects either the body or lens image blur corrector on the basis of the selection state of the image blur correction selector.

In this case, the user can use the image blur correction selector to select from the outside the image blur corrector to be used.

The camera system according to a thirteenth aspect of the present invention is the camera system of the first aspect of the present invention, wherein the camera body further has a body detection selector with which the activation and stopping of the body image blur corrector can be selected from the outside. When activate has been selected by the body detection selector, the select component selects the body image blur corrector. When stop has been selected by the body detection selector, the select component selects the lens image blur corrector.

In this case, the user can use the body detection selector to select from the outside the image blur corrector to be used.

The camera system according to a fourteenth aspect of the present invention is the camera system of the first aspect of the present invention, wherein the interchangeable lens further has a lens detection selector with which the activation and stopping of the lens image blur corrector can be selected from the outside. When activate has been selected by the lens detection selector, the select component selects the lens image blur corrector. When stop has been selected by the lens detection selector, the select component selects the body image blur corrector.

In this case, the user can use the lens detection selector to select from the outside the image blur corrector to be used.

The camera system according to a fifteenth aspect of the present invention is the camera system of the first aspect of the present invention, wherein the select component selects the image blur corrector that has been preset.

The camera body according to a sixteenth aspect of the present invention is used, along with the interchangeable lens, for a camera system for forming an image of a subject, and an interchangeable lens is removably attachable. The interchangeable lens has a lens image blur corrector configured to detect shake of the camera system and correcting blurring of an image caused by shake, and a lens controller configured to control the correcting operation of the lens image blur corrector. This camera body includes an imaging unit configured to form an image of the subject, a body image blur corrector configured to detect shake and correcting image blurring, and a body controller configured to control the imaging operation of the imaging unit and also control the correcting operation of the body image blur corrector. The body controller is capable of sending and receiving information to and from the lens controller, and has a select component configured to select either the body or lens image blur corrector, and a setting component configured to set the selected image blur corrector to a correction enabled state and setting the other image blur corrector to a correction disabled state.

With this camera body, the body controller sets one image blur corrector to a correction enabled state, and sets the other image blur corrector to a correction disabled state. As a result, the image blur correctors can be operated properly even if they are installed in both the camera body and the interchangeable lens.

The term "correction enabled state" as used here means a state in which an image blur corrector can perform its correction operation. The term "correction disabled state" means a state in which an image blur corrector cannot perform its correction operation, and "correction disabled state" encompasses, for example, a state in which the correcting lens of an image blur corrector is mechanically fixed in its middle position, or a state in which the correcting lens is electrically supported in its middle position.

The camera body according to a seventeenth aspect of the present invention is the camera body of the sixteenth aspect of the present invention, wherein the body controller holds body information pertaining to the camera body, and the lens controller holds lens information pertaining to the interchangeable lens. The select component selects either the body or lens image blur corrector on the basis of the body information and lens information.

As a result, the image blur correctors can be selected according to their specifications, etc., and the image blur correction performance of the camera system can be maximized.

The interchangeable lens according to a eighteenth aspect of the present invention is used, along with a camera body, for a camera system for forming an image of a subject, and is removably attachable to the camera body, which has a body controller. This interchangeable lens includes a lens image blur corrector configured to detect shake of the camera system and correcting blurring of the image caused by shake of the camera system, and a lens controller configured to control the correcting operation of the lens image blur corrector. The lens controller holds lens information pertaining to the interchangeable lens, and is capable of sending and receiving the lens information to and from the body controller according to commands from the body controller. The lens controller sets the lens image blur corrector to a correction enabled state on the basis of a correction enable signal from the body controller, and sets the lens image blur corrector to a correction disabled state on the basis of a correction disable signal from the body controller.

With this interchangeable lens, the lens controller switches the lens image blur corrector between the correction enabled and correction disabled states on the basis of a signal from the body controller. As a result, the image blur correctors can be operated properly even if they are installed in both the camera body and the interchangeable lens.

The term "correction enabled state" as used here means a state in which an image blur corrector can perform its correction operation. The term "correction disabled state" means a state in which an image blur corrector cannot perform its correction operation, and "correction disabled state" encompasses, for example, a state in which the correcting lens of an image blur corrector is mechanically fixed in its middle position, or a state in which the correcting lens is electrically supported in its middle position.

The interchangeable lens according to a nineteenth aspect of the present invention is the interchangeable lens of the eighteenth aspect of the present invention, wherein the lens information includes at least one of the following: lens specifying information for specifying the model of the interchangeable lens, lens-side detection performance information pertaining to the detection performance of the lens image blur corrector, lens-side correction performance information pertaining to the correction performance of the lens image blur corrector, lens-side power consumption information pertaining to the power consumption of the lens image blur corrector, and lens-side drive style information pertaining to the drive style of the lens image blur corrector.

The method for controlling a camera system according to a twentieth aspect of the present invention method for controlling a camera system for forming an image of a subject, the camera system comprising a camera body and an interchangeable lens that is removably attachable to the camera body. The camera body has an imaging unit configured to form an image of the subject, a body image blur corrector configured to detect shake of the camera system and correcting blurring of an image caused by the shake, and a body controller configured to control the imaging operation of the imaging unit and also controlling the correcting operation of the body image blur corrector. The interchangeable lens has a lens image blur corrector configured to detect the shake and correcting blurring of the image, and a lens controller configured to control the correcting operation of the lens image blur corrector. The body controller is capable of sending and receiving information to and from the lens controller. This control method includes a selection step in which the body controller selects either the body or lens image blur corrector, a correction enable setting step in which the body controller sets the image blur corrector selected in the selection step to a correction enabled state, and a correction disable step in which the body controller sets the other image blur corrector to a correction disabled state.

With this control method, the body controller sets one image blur corrector to a correction enabled state, and sets the other image blur corrector to a correction disabled state. As a result, the image blur correctors can be operated properly even if they are installed in both the camera body and the interchangeable lens.

The term "correction enabled state" as used here means a state in which an image blur corrector can perform its correction operation. The term "correction disabled state" means a state in which an image blur corrector cannot perform its correction operation, and "correction disabled state" encompasses, for example, a state in which the correcting lens of an image blur corrector is mechanically fixed in its middle position, or a state in which the correcting lens is electrically supported in its middle position.

The method for controlling a camera system according to a twenty-first aspect of the present invention is the method for controlling a camera system of the twentieth aspect of the present invention, wherein the body controller holds body information pertaining to the camera body, and the lens controller holds lens information pertaining to the interchangeable lens. In the selection step, either the body or lens image blur corrector is selected on the basis of the body information and lens information.

As a result, the image blur correctors can be selected according to their specifications, etc., and the image blur correction performance of the camera system can be maximized.

DESCRIPTION OF REFERENCE NUMERALS

Figure 1:
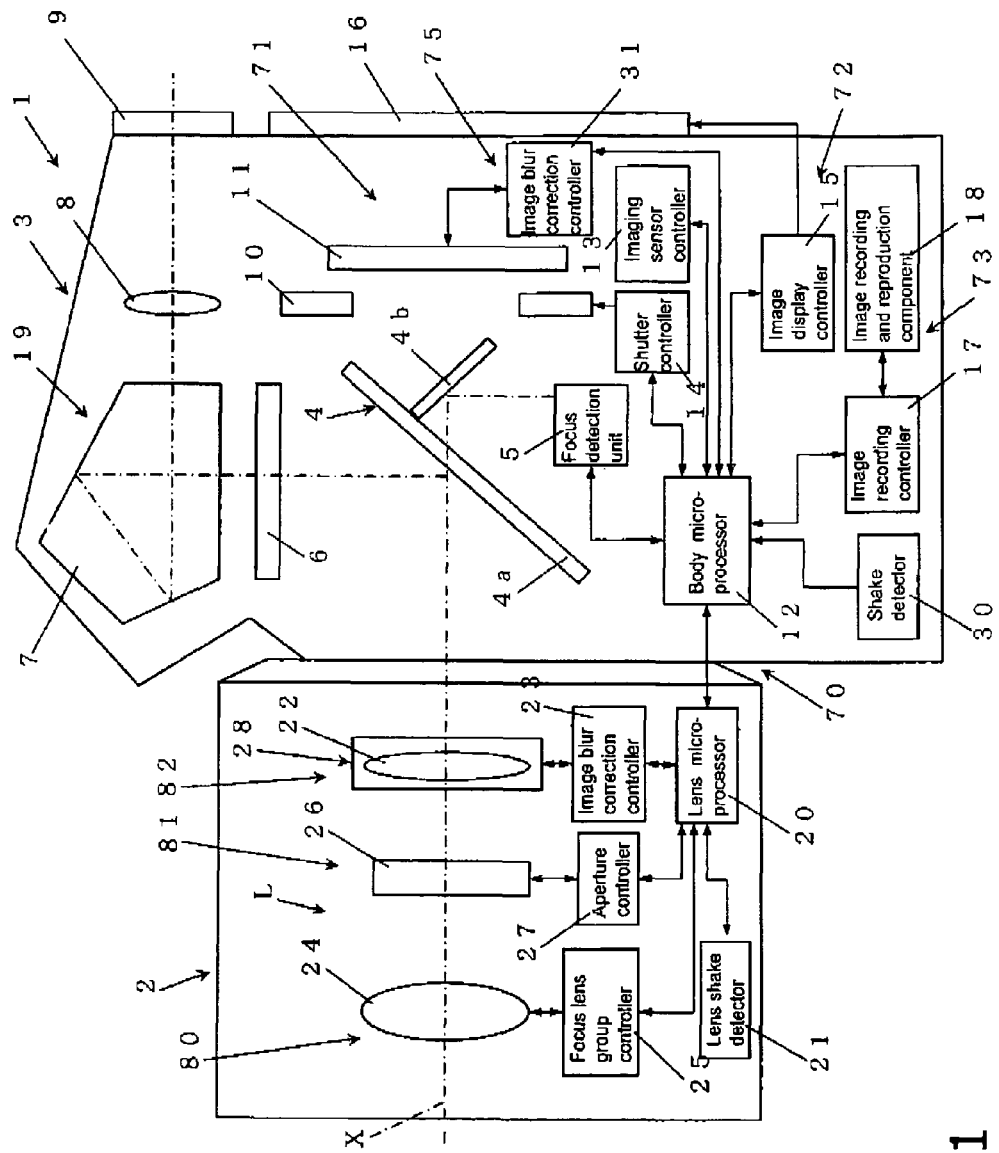
FIG. 1 is a block diagram of an interchangeable lens and camera body control system pertaining to a first embodiment of the present invention.

L imaging optical system
Df defocus amount
X optical path
1 camera system
2 interchangeable lens
3 camera body
4 quick return mirror
10 shutter unit
11 imaging sensor
12 body microprocessor (body controller)
16 liquid crystal monitor
20 lens microprocessor (lens controller)
21 lens shake detector
22 shake correction lens group
23 image blur correction controller
24 focus lens group
27 aperture controller
28 correction lens driver
29 memory unit within interchangeable lens
30 body shake detector
31 image blur correction controller
32 quick return mirror controller
35 imaging sensor driver
38 memory component within digital camera
50 release button

51 image blur correction operation select switch (image blur correction selector)
52 power switch
75 body image blur corrector
76 body image blur correct component
82 lens image blur corrector
83 lens image blur correct component
360, 361 angular velocity sensor power controller
365 battery controller
366 battery

BEST MODE FOR CARRYING OUT THE INVENTION

Embodiments of the present invention will now be described through reference to the drawings.

First Embodiment

1: Overall Configuration of Camera System

Figure 2:
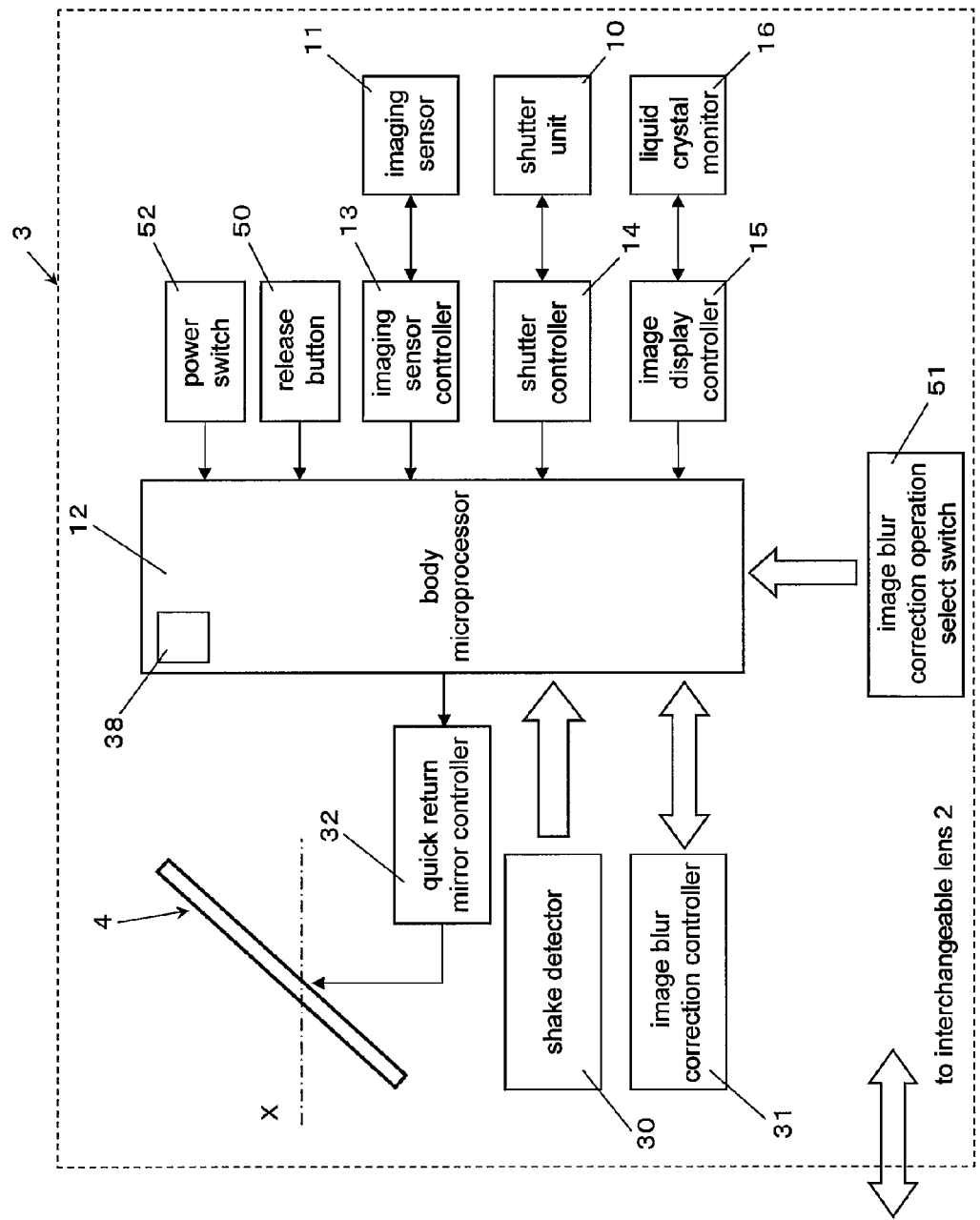
FIG. 2 is a block diagram of control system inside a camera body pertaining to the first embodiment of the present invention.
Figure 3:
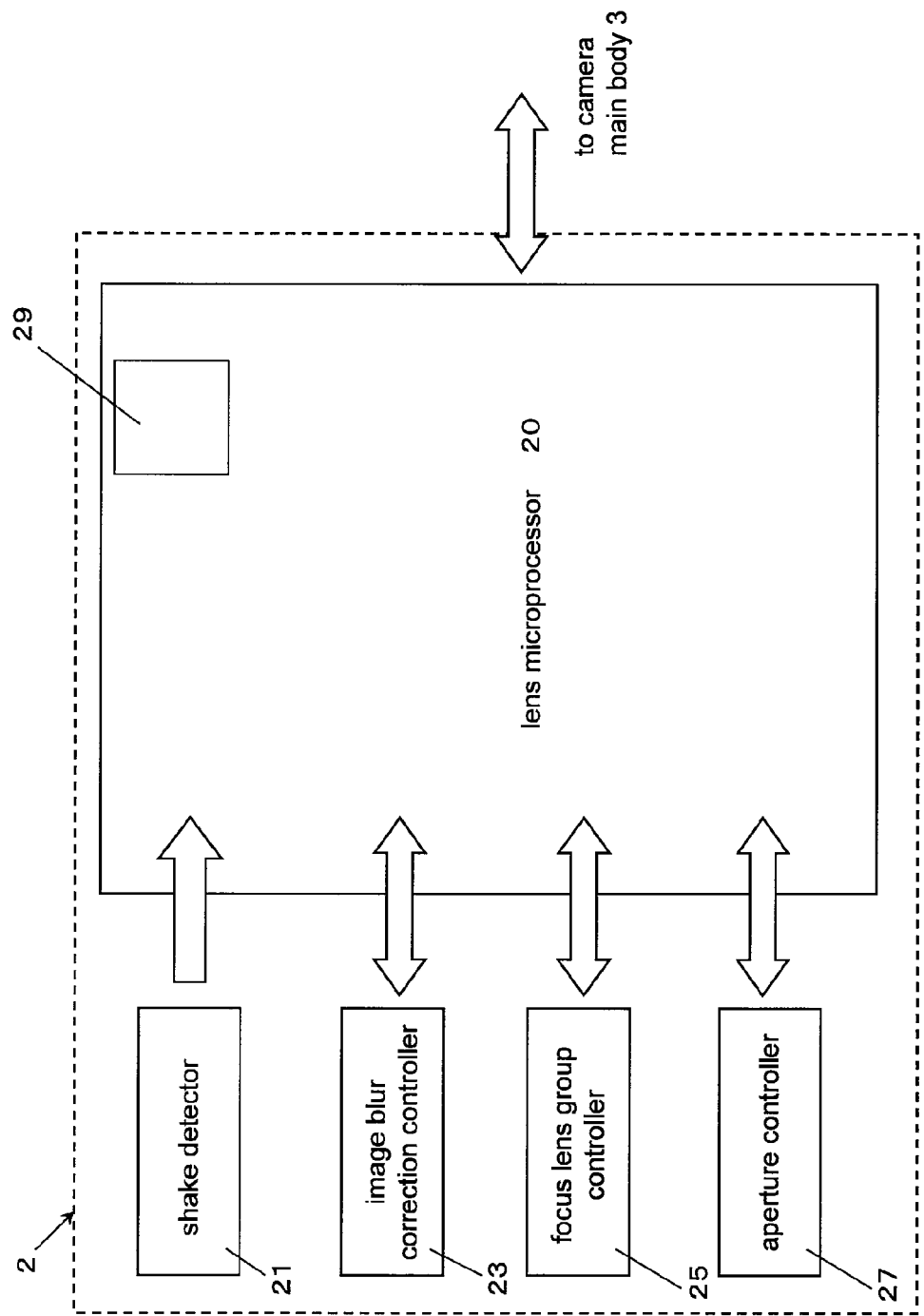
FIG. 3 is a block diagram of the control system inside an interchangeable lens pertaining to the first embodiment of the present invention.

The camera system pertaining to the first embodiment of the present invention will be described through reference to FIGS. 1 to 3. FIG. 1 is a diagram of the overall configuration of the camera system pertaining to the first embodiment of the present invention, FIG. 2 is a simplified diagram of the configuration of the camera body, and FIG. 3 is a simplified diagram of the configuration of the interchangeable lens.

As shown in FIG. 1, a camera system 1 is an interchangeable lens type of single-reflex digital camera system, and is mainly made up of a camera body 3 having the primary function of the camera system 1, and an interchangeable lens 2 that is removably attached to the camera body 3. The interchangeable lens 2 is mounted on a lens mount 70 provided to the front face of the camera body 3.

1.1: Camera Body

The camera body 3 is mainly made up of an imaging unit 71 for forming an image of a subject, a body microprocessor 12 serving as a body controller for controlling the operation of the various components such as the imaging unit 71, an image display component 72 for displaying the captured image and various kinds of information, an image holder 73 for holding image data, and a viewfinder optical system 19 through which the subject can be seen.

The imaging unit 71 is mainly made up of a quick return mirror 4 for guiding incident light to the viewfinder optical system 19 and a focus detection unit 5, an imaging sensor 11 such as a CCD for performing opto-electric conversion, a shutter unit 10 for adjusting the exposure state of the imaging sensor 11, a shutter controller 14 for controlling the drive of the shutter unit 10 on the basis of a control signal from the body microprocessor 12, an imaging sensor controller 13 for controlling the operation of the imaging sensor 11, a body image blur corrector 75 for correcting image blur produced by shake of the camera system 1, and the focus detection unit 5 for detecting focus (the focussed state of the subject image). The focus detection unit 5 performs its focus detection, for example, by a standard phase difference detection method.

The body microprocessor 12 is a control device serving as the functional center of the camera body 3, and controls various sequences. More specifically, the body microprocessor 12 is equipped with a CPU, ROM, and RAM, and the body microprocessor 12 can perform many different functions when programs held in the ROM are read into the CPU. For instance, the body microprocessor 12 has the function of detecting that the interchangeable lens 2 has been mounted on the camera body 3, the function of selecting which image blur corrector will perform image blur correction, the function of setting the image blur corrector to a correction enabled state or correction disabled state, and so on. As shown in FIG. 1, the body microprocessor 12 is connected to the various components provided to the camera body 3.

The image display component 72 is made up of a liquid crystal monitor 16 for image display, and an image display controller 15 for controlling the operation of the liquid crystal monitor 16. The image holder 73 is made up of, for example, an image recording and reproduction component 18 for recording and reproducing captured images to and from a card-type recording medium (not shown), and an image recording controller 17 for controlling the operation of the image recording and reproduction component 18.

The quick return mirror 4 is made up of a main mirror 4a capable of reflecting and transmitting incident light, and a sub-mirror 4b that is provided on the rear face side of the main mirror 4a and reflects light transmitted from the main mirror 4a, and can be flipped up outside the optical path X by a quick return mirror controller 32. This incident light is split into two beams by the main mirror 4a, and the reflected beam is guided to the viewfinder optical system 19. The transmitted beam, meanwhile, is reflected by the sub-mirror 4b and utilized as an AF light beam for the focus detection unit 5. During normal photography, the quick return mirror 4 is flipped up outside the optical path X by the quick return mirror controller 32, and the shutter unit 10 is opened, so that an image of the subject is formed on the imaging surface of the imaging sensor 11. When photography is not in progress, as shown in FIG. 1, the quick return mirror 4 is disposed in the optical path X, and the shutter unit 10 is closed.

The viewfinder optical system 19 is made up of a viewfinder screen 6 where an image of the subject is formed, a pentaprism 7 for converting the subject image into an erect image, an eyepiece 8 for guiding the erect image of the subject to a viewfinder window 9, and the viewfinder window 9 through which the user can see the subject.

As shown in FIG. 2, the camera body 3 is provided with a power switch 52 for switching the power on and off to the camera system 1, and a release button 50 operated by the user during focusing and release. When the power switch 52 is used to turn on the power, power is supplied to the various components of the interchangeable lens 2 and the camera body 3. When the release button 50 is pressed down halfway, power is supplied to the various components including the body microprocessor 12 and a lens microprocessor 20.

A memory component 38 holds various kinds of information related to the camera body 3 (body information). This body information includes, for example, information related to the model, for identifying the camera body 3, such as the name of the manufacturer of the camera body 3, the date of manufacture, the model number, the version of software installed in the body microprocessor 12, and information related to firmware updates (body specifying information); information related to whether or not an image blur corrector has been mounted in the camera body 3; when an image blur corrector has been mounted, information related to the detection performance, such as the sensitivity and the model number of a shake detector 30 (discussed below) (body-side detection performance information); information related to correction performance, such as the maximum possible correction angle and the model number of an image blur correct component 76 (body-side correction performance information); and the version of the software used to perform image blur correction. Further, the body information also includes information related to the power consumption necessary to drive the image blur correct component 76 (body-side power consumption information) and information related to the drive style of the image blur correct component 76 (body-side drive style information). The memory component 38 can also hold information sent from the body microprocessor 12.

1.2: Interchangeable Lens

The interchangeable lens 2 constitutes an imaging optical system L for forming an image of a subject on the imaging sensor 11 in the camera system 1, and is mainly made up of a focus adjuster 80 for performing focusing, an aperture adjuster 81 for adjusting the aperture, a lens image blur corrector 82 for correcting image blur by adjusting the optical path, and the lens microprocessor 20 serving as a lens controller for controlling the operation of the interchangeable lens 2.

The focus adjuster 80 is mainly made up of a focus lens group 24 for adjusting the focus, and a focus lens group controller 25 for controlling the operation of the focus lens group 24. The aperture adjuster 81 is mainly made up of a diaphragm 26 for adjusting the aperture or opening, and an aperture controller 27 for controlling the operation of the diaphragm 26.

The lens microprocessor 20 is a control device serving as the functional center of the interchangeable lens 2, and is connected to the various components mounted in the interchangeable lens 2. More specifically, the lens microprocessor 20 is equipped with a CPU, ROM, and RAM, and can perform many different functions when programs held in the ROM are read into the CPU. For instance, the lens microprocessor 20 has the function of setting the lens image blur corrector 82 to a correction enabled state or a correction disabled state on the basis of a signal from the body microprocessor 12. Also, the body microprocessor 12 and the lens microprocessor 20 are electrically connected via electrical contacts (not shown) provided to the lens mount 70, which allows them to exchange information.

A memory component 29 in the microprocessor 20 holds various kinds of information related to the interchangeable lens 2 (lens information). This lens information includes, for example, information related to the model, for identifying the interchangeable lens 2, such as the name of the manufacturer of the interchangeable lens 2, the date of manufacture, the model number, the version of software installed in the lens microprocessor 20, and information related to firmware updates (lens specifying information); information related to whether or not an image blur corrector has been mounted in the interchangeable lens 2; when an image blur corrector has been mounted, information related to the detection performance, such as the sensitivity and the model number of a shake detector 21 (discussed below) (lens-side detection performance information); information related to correction performance, such as the maximum possible correction angle and the model number of an image blur correct component 83 (lens-side correction performance information); and the version of the software used to perform image blur correction. Further, the lens information also includes information related to the power consumption necessary to drive the image blur correct component 83 (lens-side power consumption information) and information related to the drive style of the image blur correct component 83 (lens-side drive style information). The memory component 38 can also hold information sent from the microprocessor 12.

1.3: Inage Blur Corrector

Figure 4:
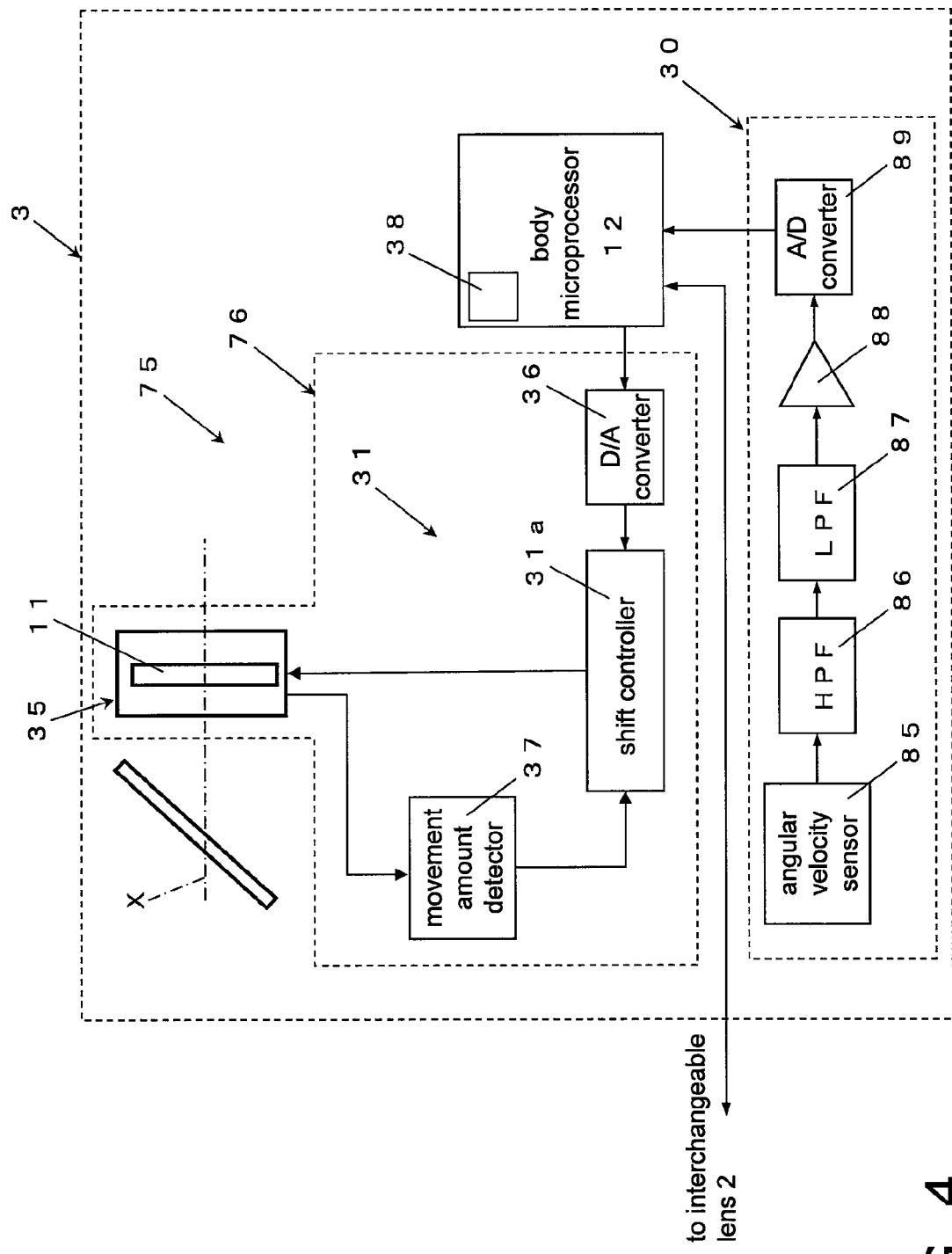
FIG. 4 is a block diagram of the hardware of an image blur corrector inside a camera body pertaining to the first embodiment of the present invention.
Figure 5:
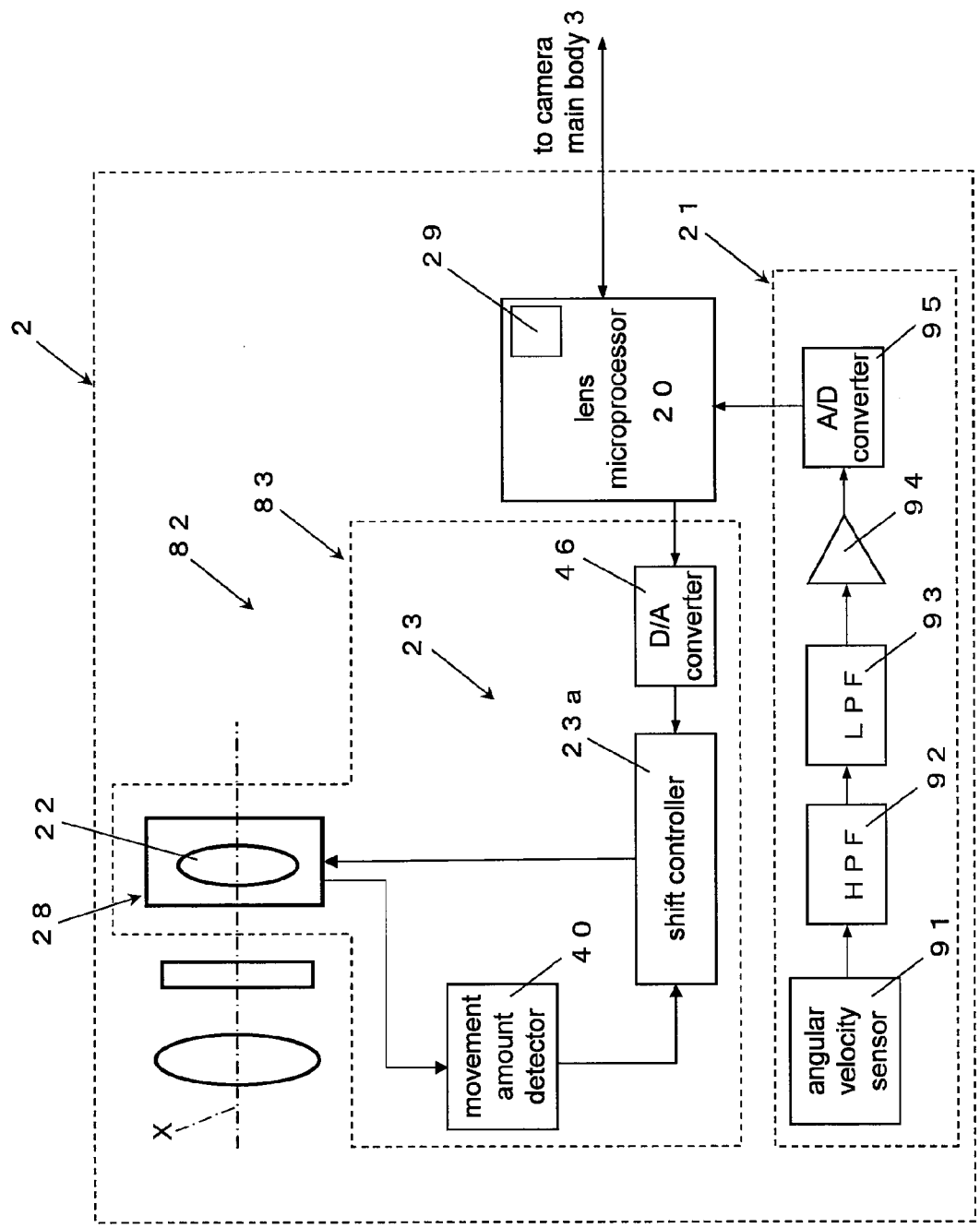
FIG. 5 is a block diagram of the hardware of an image blur corrector inside an interchangeable lens pertaining to the first embodiment of the present invention.

The body image blur corrector 75 and the lens image blur corrector 82 will now be described through reference to FIGS. 4 and 5. FIG. 4 is a block diagram of the hardware of the body image blur corrector 75, and FIG. 5 is a block diagram of the hardware of the lens image blur corrector 82.

Body Image Blur Corrector

As shown in FIG. 4, the body image blur corrector 75 is made up of the body shake detector 30 for detecting shake of the camera system 1, and the body image blur correct component 76 for correcting image blur according to the amount of shake of the camera system 1 detected by the shake detector 30.

The shake detector 30 is mainly made up of an angular velocity sensor 85 for detecting the movement of the camera system 1 itself including the imaging optical system L, an HPF (high-pass filter) 86 for eliminating the DC drift component from the unnecessary band component included in the output of the angular velocity sensor 85, an LPF (low-pass filter) 87 for eliminating the noise component or resonance frequency component of the sensor from the unnecessary band component included in the output of the angular velocity sensor 85, an amplifier 88 for adjusting the level of the output signal from the angular velocity sensor 85, and an A/D converter 89 for converting the output signal of the amplifier 88 into a digital signal.

The angular velocity sensor 85 outputs a positive or negative angular velocity signal, depending on the direction of movement of the camera system 1, on the basis of output in a state in which the camera system 1 is stopped. The angular velocity sensor 85 is a sensor for detecting movement in the yaw direction perpendicular to the optical axis, for example. An example of the angular velocity sensor 85 is a gyro sensor. In FIG. 4, the angular velocity sensor 85 for just one direction is shown, and the shake detector for the pitch direction is omitted.

The angular velocity sensor 85 built into the shake detector 30 thus has the function of detecting movement of the camera system 1 caused by hand shake or other vibration.

The body image blur correct component 76 is mainly made up of the imaging sensor 11 as part of the imaging unit 71, an imaging sensor driver 35 for moving the imaging sensor 11 up, down, left, and right within a plane perpendicular to the optical axis X of the imaging optical system L, and an image blur correction controller 31 for controlling the drive of the imaging sensor driver 35.

The image blur correction controller 31 further is made up of a movement amount detector 37 for detecting the actual amount of movement of the imaging sensor 11 by the imaging sensor driver 35, a shift controller 31a for controlling the operation of the imaging sensor driver 35 so that the amount of movement detected by the movement amount detector 37 will be the drive control amount outputted from the body microprocessor 12 (hereinafter referred to as a control signal), and a D/A converter 36 for converting the control signal outputted from the body microprocessor 12 into an analog signal. A feedback control loop for drive control of the imaging sensor driver 35 is formed in the interior of the image blur corrector 75 by the shift controller 31a and the movement amount detector 37.

Also, the body microprocessor 12 has a control signal generator for subjecting the output signal of the angular velocity sensor 85 taken in via the A/D converter 89 to filtering, integration processing, phase compensation, gain adjustment, clipping, or the like, and finding and outputting the control signal of the imaging sensor 11 necessary for image blur correction. The control signal that is found here is outputted through the D/A converter 36 of the image blur correction controller 31 to the shift controller 31a. The shift controller 31a controls the drive of the imaging sensor 11 on the basis of this control signal.

Thus, the imaging sensor 11 is shifted by the imaging sensor driver 35 so that the amount of shake detected by the shake detector 30 will be canceled out. As a result, image blur produced by shake of the camera system 1 can be corrected on the camera body 3 side, the effect of hand shake or the like by the user can be suppressed, and a better image can be captured.

Various kinds of program for controlling the drive of the camera body 3, or data indicating the amount of shift from the optical axis center of the imaging sensor 11 according to the focal length of the interchangeable lens 2 used during image blur correction, etc., is stored in the memory component 38 of the body microprocessor 12. In general, the correction range of an image blur corrector featuring an image sensor is in a specific relationship with the focal length of the attached interchangeable lens. That is, if we let f (m) be the focal length of the interchangeable lens, and θ(rad) be the angle at which the camera system is shaken by vibration within a specific time (within the exposure time), then the amount ΔY (m) of movement of the image over the image sensor is expressed by the following Formula 1.

$$\Delta Y = f \times \tan \theta \quad (1)$$

Therefore, image blur can be corrected by driving the imaging sensor 11 in reverse during image blur correction, and canceling out the amount of movement ΔY of this image. In other words, the maximum possible correction angle θ at which image blur can be corrected is determined by the movable range of the individual image blur correctors 75 and 82.

Lens Image Blur Corrector

As shown in FIG. 5, the lens image blur corrector 82 is an optical type of image blur corrector, and is mainly made up of the lens shake detector 21 for detecting shake of the camera system 1, and the lens image blur correct component 83 for correcting image blur according to the amount of shake detected by the shake detector 21.

The shake detector 21 is mainly made up of an angular velocity sensor 91 for detecting the movement of the camera system 1 itself, including the camera system 1, an HPF 92 as a high-pass filter for eliminating the DC drift component from the unnecessary band component included in the output of the angular velocity sensor 91, an LPF 93 as a low-pass filter for eliminating the noise component or resonance frequency component of the sensor from the unnecessary band component included in the output of the angular velocity sensor 91, an amplifier 94 for adjusting the level of the output signal from the amplifier 94, and an A/D converter 95 for converting the output signal of the amplifier 94 into a digital signal. An example of the angular velocity sensor 91 is a gyro sensor.

The image blur correct component 83 is mainly made up of the blur correction lens group 22 that constitutes part of the imaging optical system L, a correction lens driver 28 for moving the blur correction lens group 22 within a plane perpendicular to the optical axis X of the imaging optical system L, and an image blur correction controller 23 for controlling the operation of the correction lens driver 28 according to the amount of shake detected by the shake detector 21.

The image blur correction controller 23 is further made up of a movement amount detector 40 for detecting the actual amount of movement of the blur correction lens group 22 by the correction lens driver 28, a shift controller 23a for controlling the operation of the correction lens driver 28 so that the amount of movement detected by the movement amount detector 40 will be the drive control amount outputted from the lens microprocessor 20 (hereinafter referred to as a control signal), and a D/A converter 46 for converting the control signal outputted from the lens microprocessor 20 into an analog signal. A feedback control loop for drive control of the correction lens driver 28 is formed in the interior of the lens image blur corrector 82 by the shift controller 23a and the movement amount detector 40.

Thus, image blur can be corrected by shifting the imaging sensor 11 with the imaging sensor driver 35 so that the amount of shake detected by the shake detector 30 will be canceled out.

The lens microprocessor 20 has a control signal generator for subjecting the output signal of the angular velocity sensor 91 taken in via the A/D converter 45 to filtering, integration processing, phase compensation, gain adjustment, clipping, or the like, and finding and outputting the control signal of the imaging sensor driver 35 necessary for image blur correction. The control signal that is found here is outputted through the D/A converter 36 to the image blur correction controller 23. The image blur correction controller 23 controls the drive of the blur correction lens group 22 on the basis of this control signal. As a result, image blur produced by shake of the camera system 1 can be optically corrected on the interchangeable lens 2 side, the effect of hand shake or the like by the user can be suppressed, and a better image can be captured.

Various kinds of program for controlling the drive of the interchangeable lens 2, or data indicating the relationship between the amount of movement of the focus lens group 24 and the distance to the subject or the focal length, or data indicating the amount of shift from the optical axis center of the blur correction lens group 22 according to the focal length, etc., is stored in the memory component 29 of the lens microprocessor 20. As to the amount of shift of this blur correction lens group 22, information pertaining to the maximum possible correction angle θ at which image blur can be corrected by the interchangeable lens 2, on the basis of the amount of image movement ΔY expressed by the previously mentioned Formula 1, is stored in the memory component 29. The memory component 29 also stores information about the power consumption necessary for driving the blur correction lens group 22 during image blur correction, for example.

2: Operation of the Camera System

Figure 6:
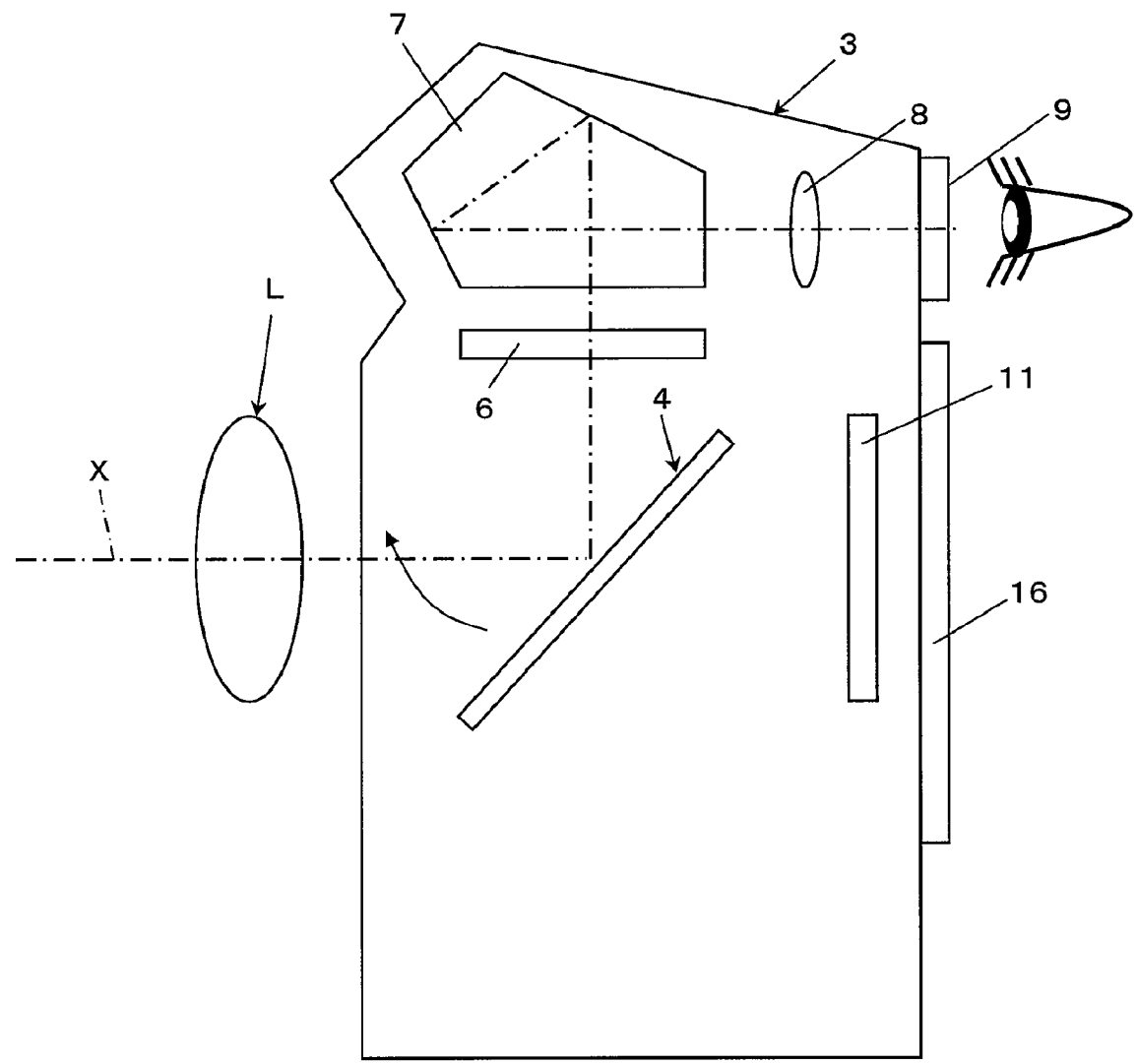
FIG. 6 is a concept diagram illustrating the concept of photography pertaining to the first embodiment of the present invention.

The imaging operation of the camera system 1 will be described through reference to FIGS. 1 to 6. FIG. 6 is a concept diagram during photography with the camera system 1.

2.1: Operation Prior to Imaging

As shown in FIGS. 1 and 6, light from a subject (not shown) passes through the interchangeable lens 2 and is incident on the main mirror 4a, which is a semitransparent mirror. Part of the light incident on the main mirror 4a is reflected and is incident on the viewfinder screen 6, and the rest of the light is transmitted and is incident on the sub-mirror 4b. The light incident on the viewfinder screen 6 forms a subject image. This subject image is converted by the pentaprism 7 into an erect image, which is incident on the eyepiece 8. This allows the user to observe an erect image of the subject through the viewfinder window 9. Also, the light incident on the sub-mirror 4b is reflected and is incident on the focus detection unit 5.

2.2: Operation During Imaging

As shown in FIGS. 1 and 6, when the user looks through the viewfinder window 9 to take a photograph, and when the user presses the release button 50 halfway down, power is supplied to the body microprocessor 12 and the various units in the camera system 1, and the body microprocessor 12 and the lens microprocessor 20 are activated. The body microprocessor 12 and the lens microprocessor 20 are programmed so as to exchange information back and forth upon activation via the electrical contacts (not shown) of the lens mount 70. For instance, lens information related to the interchangeable lens 2 is sent from the memory component 29 of the lens microprocessor 20 to the body microprocessor 12, and this lens information is held in the memory component 38 of the body microprocessor 12. At this point the body microprocessor 12 also receives information related to whether or not the lens image blur corrector 82 has been installed in the interchangeable lens 2.

Next, the amount of defocus (hereinafter referred to as the Df amount) is acquired by the focus detection unit 5 on the basis of the reflected light from the sub-mirror 4b. A command is sent from the body microprocessor 12 to the lens microprocessor 20 so that the focus lens group 24 will be driven by this Df amount. More specifically, the focus lens group controller 25 is controlled by the lens microprocessor 20 and the focus lens group 24 is moved by the Df amount. The Df amount can be reduced by repeating this focus detection and drive of the focus lens group 24. Once the Df amount is at or below a specific level, it is determined by the body microprocessor 12 that the system is focused, and the drive of the focus lens group 24 is stopped.

After this, when the user presses the release button 50 down completely, a command is sent from the body microprocessor 12 to the lens microprocessor 20 so as to obtain an aperture value calculated on the basis of the output from a light sensor (not shown). The aperture controller 27 is controlled by the lens microprocessor 20, and the aperture is closed until the designed aperture is attained. Simultaneously with the designation of the aperture value, the quick return mirror 4 is retracted from the optical path X by the quick return mirror controller 32. Upon completion of this retraction, a command to drive the imaging sensor 11 is outputted from the imaging sensor controller 13, and the operation of the shutter unit 10 is indicated. The imaging sensor controller 13 exposes the imaging sensor 11 for the length of time of the shutter speed calculated on the basis of the output from a light sensor (not shown).

Upon completion of this exposure, the imaging sensor controller 13 reads image data from the imaging sensor 11, and after specific image processing, image data is outputted through the body microprocessor 12 to the image display controller 15. As a result, the captured image is displayed on the liquid crystal monitor 16. Also, image data is held in a storage medium via the image recording controller 17 and the image recording and reproduction component 18. Also, upon completion of the exposure, the quick return mirror 4 and the shutter unit 10 are reset to their initial positions by the body microprocessor 12. The microprocessor 12 issues a command to the lens microprocessor 20 to have the aperture controller 27 reset the aperture to its open position, and commands are sent from the lens microprocessor 20 to the various units. Upon completion of this resetting, the lens microprocessor 20 notifies the body microprocessor 12 of the completion of resetting. The body microprocessor 12 waits for the completion of a series of processing after exposure and the reset completion information from the lens microprocessor 20, and then confirms that the release button has not been pressed, which concludes the imaging sequence.

Figure 7:
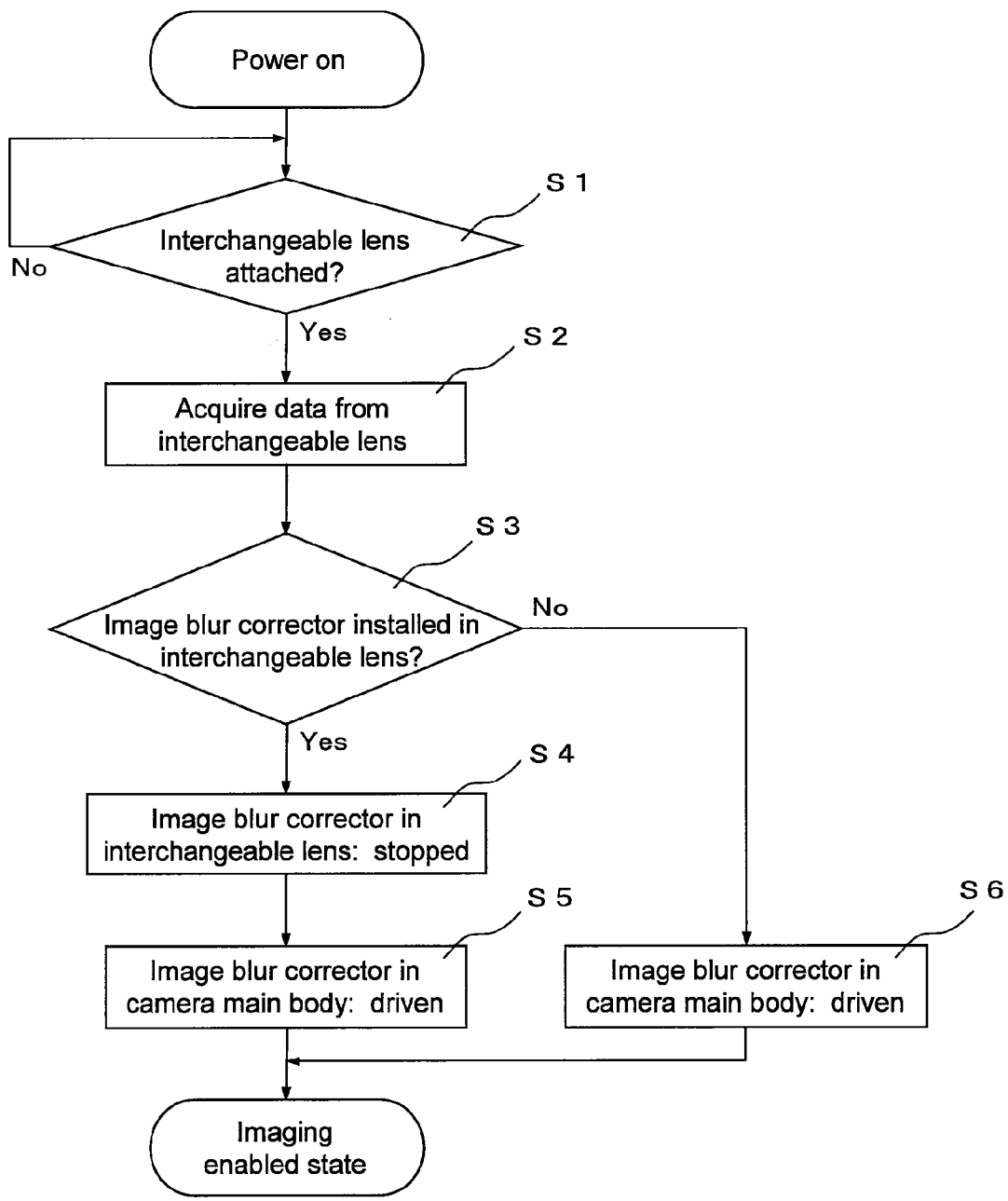
FIG. 7 is a flowchart illustrating the sequence related to the selecting operation of the image blur corrector pertaining to the first embodiment of the present invention.

2.3: Selection Operation when the Interchangeable Lens has been Mounted on the Camera Body Next, the specific operation of selecting the image blur corrector when the interchangeable lens 2 is mounted on the camera body 3 will be described through reference to FIG. 7. FIG. 7 is a flowchart of when the interchangeable lens 2 is attached to the camera body 3. The description here will be of a case in which the image blur corrector 75 on the camera body 3 side is selected preferentially as predetermined by the body microprocessor 12.

As shown in FIG. 7, when the interchangeable lens 2 is mounted on the camera body 3, the body microprocessor 12 of the camera body 3 detects that the interchangeable lens 2 has been mounted (detection step: S1). After the interchangeable lens 2 is mounted, information about whether or not the lens image blur corrector 82 has been installed in the interchangeable lens 2 is acquired by the body microprocessor 12 from the memory component 29 in the interchangeable lens 2 (S2). This information includes information related to whether or not an image blur corrector has been installed, and on the basis of this, the body microprocessor 12 determines whether or not the lens image blur corrector 82 has been installed in the interchangeable lens 2 (selection step: S3). If the lens image blur corrector 82 has been installed in the interchangeable lens 2, the body image blur corrector 75 is given preference, so the lens image blur corrector 82 is stopped (correction disabled setting step: S4), and the drive of the body image blur corrector 75 is started (correction enabled setting step: S5). On the other hand, if the lens image blur corrector 82 has not been installed in the interchangeable lens 2, the drive of the body image blur corrector 75 is automatically started (S6). To stop the image blur corrector 82 in the interchangeable lens 2 here, a mechanically locking mechanism may be used, or current may be sent to an actuator to effect self-holding, so that the optical axis X is coaxial with the optical axis center of the blur correction lens group 22. The method employed here is to preferentially drive the body image blur corrector 75, but it is also possible to preferentially drive the lens image blur corrector 82 in the interchangeable lens 2. Furthermore, if an image blur corrector is installed in just the interchangeable lens 2 or the camera body 3, but not both, then the image blur corrector that has been installed may be operated.

As discussed above, with this camera system 1, it is automatically determined whether an image blur corrector has been installed in the interchangeable lens 2 or the camera body 3, or both, and just one image blur corrector that has been preset is driven. As a result, even when image blur correctors have been installed in the camera body 3 and the interchangeable lens 2, the image blur correctors can be operated properly, without inadvertent operation.

Second Embodiment

Figure 8:
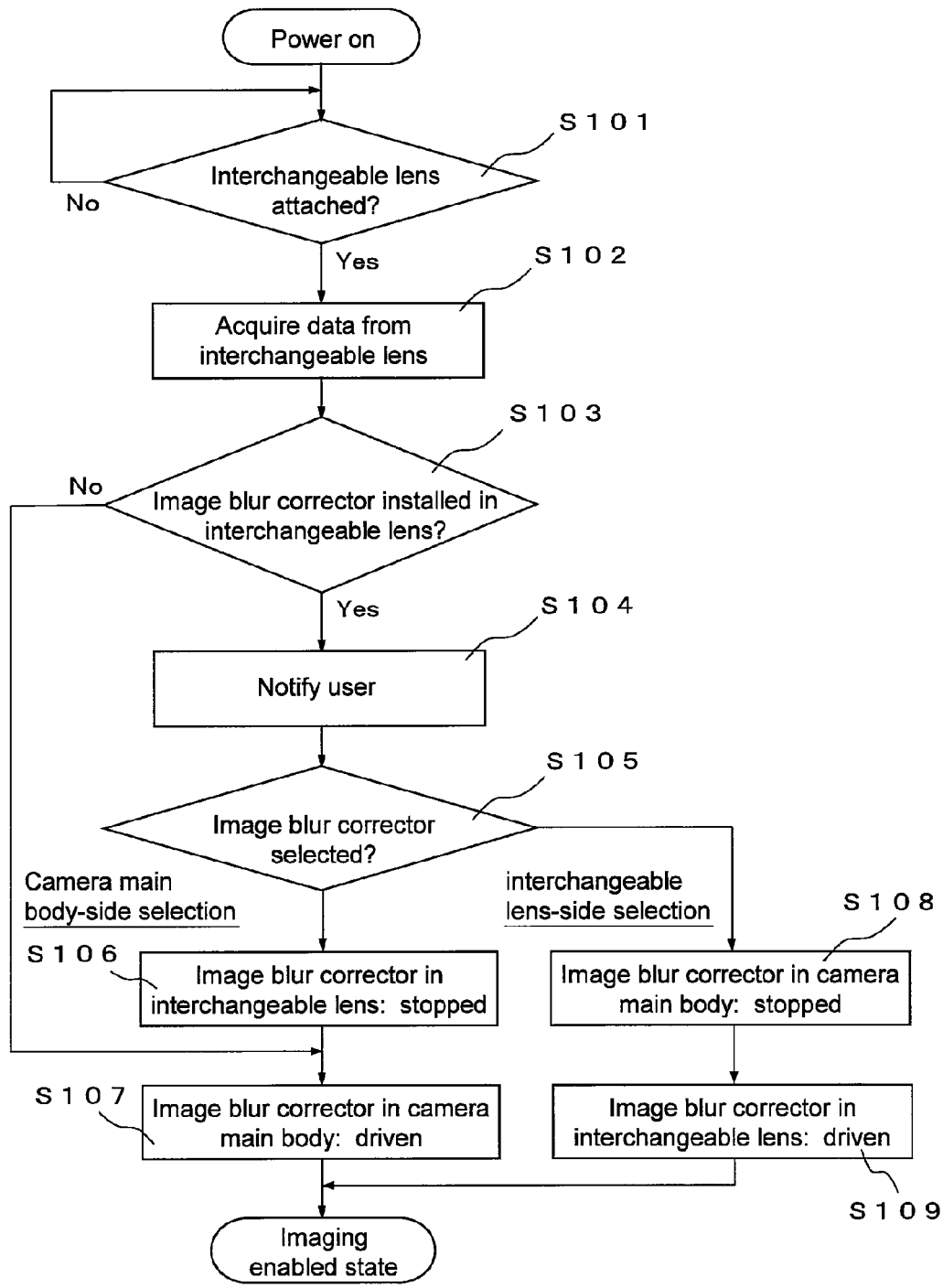
FIG. 8 is a flowchart illustrating the sequence related to the selecting operation of the image blur corrector pertaining to a second embodiment of the present invention.

In the above embodiment, the image blur corrector was automatically selected by the body microprocessor 12 when the interchangeable lens 2 was mounted. A case in which the selection is made manually by the user is also possible, however. A camera system pertaining to a second embodiment of the present invention will be described through reference to FIG. 8. FIG. 8 is a flowchart of the operation of selecting the image blur corrector pertaining to the second embodiment of the present invention. Those components that are the same as in the above embodiment will be numbered the same, and will not be described again.

As shown in FIG. 2, the camera body 3 is equipped with an image blur correction operation select switch 51. The image blur correction operation select switch 51 is a switch that allows either the body image blur corrector 75 or the lens image blur corrector 82 to be selected from the outside.

The selection operation sequence in this case will be described. As shown in FIG. 8, when the interchangeable lens 2 is mounted on the camera body 3, the body microprocessor 12 of the camera body 3 detects that the interchangeable lens 2 has been mounted (detection step: S101). After the interchangeable lens 2 is mounted, information about whether or not the image blur corrector 82 has been installed in the interchangeable lens 2 is acquired by the body microprocessor 12 from the memory component 29 in the interchangeable lens 2 (S102). This information includes information related to whether or not an image blur corrector has been installed, and on the basis of this, the body microprocessor 12 determines whether or not the image blur corrector 82 has been installed in the interchangeable lens 2 (selection step: S103). If no image blur corrector has been installed in the interchangeable lens 2, the body image blur corrector 75 is activated (S109).

On the other hand, if the lens image blur corrector 82 has been installed in the interchangeable lens 2, information about whether or not the image blur corrector 82 in the camera body 3 is being used, or whether or not the image blur corrector 75 in the interchangeable lens 2 is being used, is displayed on the liquid crystal monitor 16 (S104). The user selects one of the image blur correctors by using the image blur correction operation select switch 51 provided to the camera body 3 (selection detection step: S105). If the user selects the image blur corrector 75 in the camera body 3, the operation of the image blur corrector 82 in the interchangeable lens 2 is stopped (correction disabled setting step: S106), and the drive of the image blur corrector 75 in the camera body 3 is commenced (correction enabled setting step: S107). On the other hand, if the user selects the image blur corrector 82 in the interchangeable lens 2, the operation of the image blur corrector 75 in the camera body 3 is stopped (correction disabled setting step: S108), and the drive of the image blur corrector 82 in the interchangeable lens 2 is commenced (correction enabled setting step: S109).

As discussed above, in this case, the user can select whether to use the image blur corrector of the interchangeable lens 2 or of the camera body 3. As a result, even when an image blur corrector has been installed in the camera body 3 and the interchangeable lens 2, the image blur correctors can be operated properly, without inadvertent operation. Also, if the image blur correctors 75 and 82 have different performance or characteristics, the image blur correction that best suits the preference of the user can be carried out.

Also, either the image blur correction operation select switch 51 can be used to select either of the image blur correctors, but the following configuration may be employed.

For instance, when the image blur correction operation select switch 51 (body-side image blur correction selector) is a switch that allows the image blur corrector 75 in the camera body 3 to be switched on and off, the image blur correction operation select switch 51 can be used to select which image blur corrector will be used. For example, when the body image blur corrector 75 is switched on by the image blur correction operation select switch 51, drive of the body image blur corrector 75 is commenced by the body microprocessor 12, and the lens image blur corrector 82 is stopped. On the other hand, when the body image blur corrector 75 is switched off by the image blur correction operation select switch 51, the body image blur corrector 75 is stopped by the body microprocessor 12, and drive of the lens image blur corrector 82 is commenced.

It is also conceivable that the image blur correction operation select switch 51 (lens-side image blur correction selector) will be provided on the interchangeable lens 2 side, and be a switch that allows the image blur corrector 82 in the interchangeable lens 2 to be switched on and off. For instance, when the lens image blur corrector 82 is switched on by the image blur correction operation select switch 51, drive of the lens image blur corrector 82 is commenced by the lens microprocessor 20, and the body image blur corrector 75 is stopped by the body microprocessor 12. On the other hand, when the lens image blur corrector 82 is switched off by the image blur correction operation select switch 51, the lens image blur corrector 82 is stopped by the lens microprocessor 20, and drive of the body image blur corrector 75 is commenced by the body microprocessor 12.

Again in these cases, the image blur correctors can be operated properly, without inadvertent operation.

Third Embodiment

Figure 9:
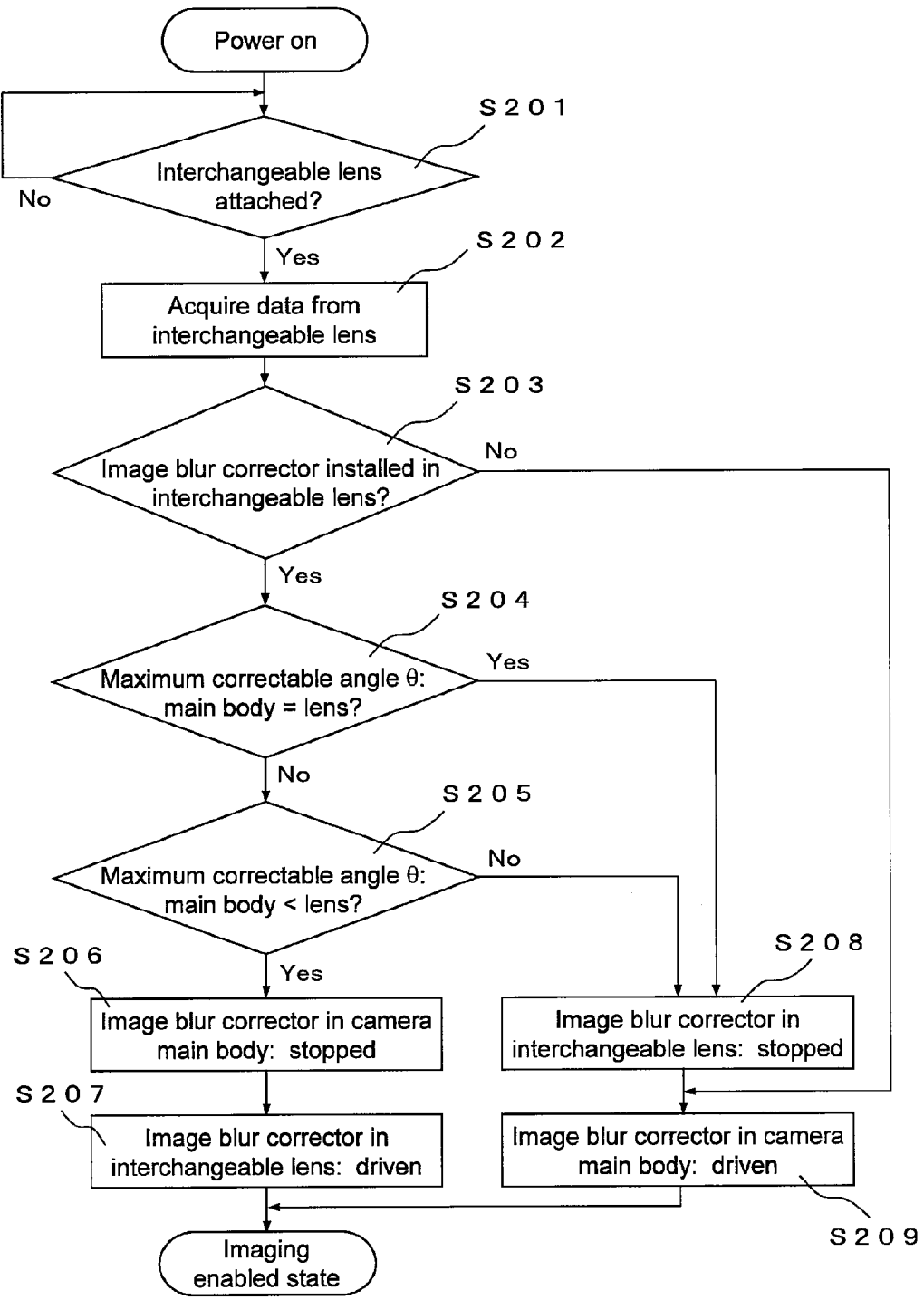
FIG. 9 is a flowchart illustrating the sequence related to the selecting operation of the image blur corrector pertaining to a third embodiment of the present invention.

With the first embodiment above, when an image blur corrector is installed in the camera body 3 and the interchangeable lens 2, it is predetermined whether the body image blur corrector 75 or the lens image blur corrector 82 will be given preference. With the second embodiment above, the user selects one image blur corrector. However, it is also possible to determine which image blur corrector will be selected on the basis of specific information held in the memory components 29 and 36. The camera system pertaining to a third embodiment of the present invention will be described through reference to FIG. 9. FIG. 9 is a flowchart of the operation of selecting the image blur corrector pertaining to a third embodiment of the present invention. Those components that are the same as in the above embodiment will be numbered the same, and will not be described again.

As shown in FIG. 9, the body microprocessor 12 determines whether or not the interchangeable lens 2 has been mounted on the camera body 3 (detection step: S201). If it is determined that the interchangeable lens 2 has been mounted, information about whether or not the image blur corrector 82 has been installed in the interchangeable lens 2 is acquired by the body microprocessor 12 from the memory component 29 in the interchangeable lens 2 (S202). Next, it is determined on the basis of this information whether or not the image blur corrector 82 has been installed in the interchangeable lens 2 (S203). If the image blur corrector 82 has been installed, the body information and lens information are compared by the body microprocessor 12. More specifically, the maximum correctable angle of the body image blur corrector 75 included in the body information is compared with the maximum correctable angle of the lens image blur corrector 82 included in the lens information (selection step: S204). If the maximum correctable angles θ are the same, then, for example, the lens image blur corrector 82 is stopped (S208), and the predetermined drive of the body image blur corrector 75 is commenced (S209). If the maximum correctable angles θ are different, which of the image blur correctors is better suited is determined on the basis of the maximum correctable angles θ (selection step: S205). For instance, in close-up photography with a macro lens at a maximum magnification of 1/1, the adverse effect caused by hand shake is more pronounced than during ordinary photography. Therefore, a sufficient correction angle must be ensured during close-up photography with a macro lens. That is, when a macro lens is used, a more stable correction effect will be obtained when using the image blur corrector with the larger maximum correctable angle designed specifically for macro lens use. Therefore, in this case, the image blur corrector 82 mounted in the interchangeable lens 2 (the image blur corrector with the larger maximum correctable angle) is selected (selection step: S205). Next, the image blur corrector 75 in the camera body 3 is stopped (set to a correction disabled state) (S206), and the image blur corrector 82 in the interchangeable lens 2 is driven (set to a correction enabled state) (S207). Also, when the body image blur corrector 75 has a greater maximum correctable angle than the lens image blur corrector 82, the image blur corrector 82 in the interchangeable lens 2 is stopped (S208), and the image blur corrector 75 in the camera body 3 is driven (S209). If the image blur corrector 82 is not installed in the interchangeable lens 2, the image blur corrector 75 in the camera body 3 is automatically driven (S209).

As discussed above, in this case which of the image blur correctors is driven is automatically determined by the specifications of the camera body 3 and the interchangeable lens 2 (more specifically, on the basis of the maximum correctable angles of the image blur correctors). As a result, even when image blur correctors are installed in the camera body 3 and the interchangeable lens 2, the image blur correctors can be operated properly, without inadvertent operation. Also, the image blur corrector that is best suited to the type of interchangeable lens 2 or to the photography conditions can be selected, affording better image blur correction.

The interchangeable lens 2 is not limited to being a macro lens, and may be a telephoto lens, with which the adverse effect of hand shake is pronounced. In particular, it can be automatically selected according to the type of interchangeable lens 2 (such as its focal length), or the size of the effective image circle on the imaging sensor 11.

Fourth Embodiment

Figure 10:
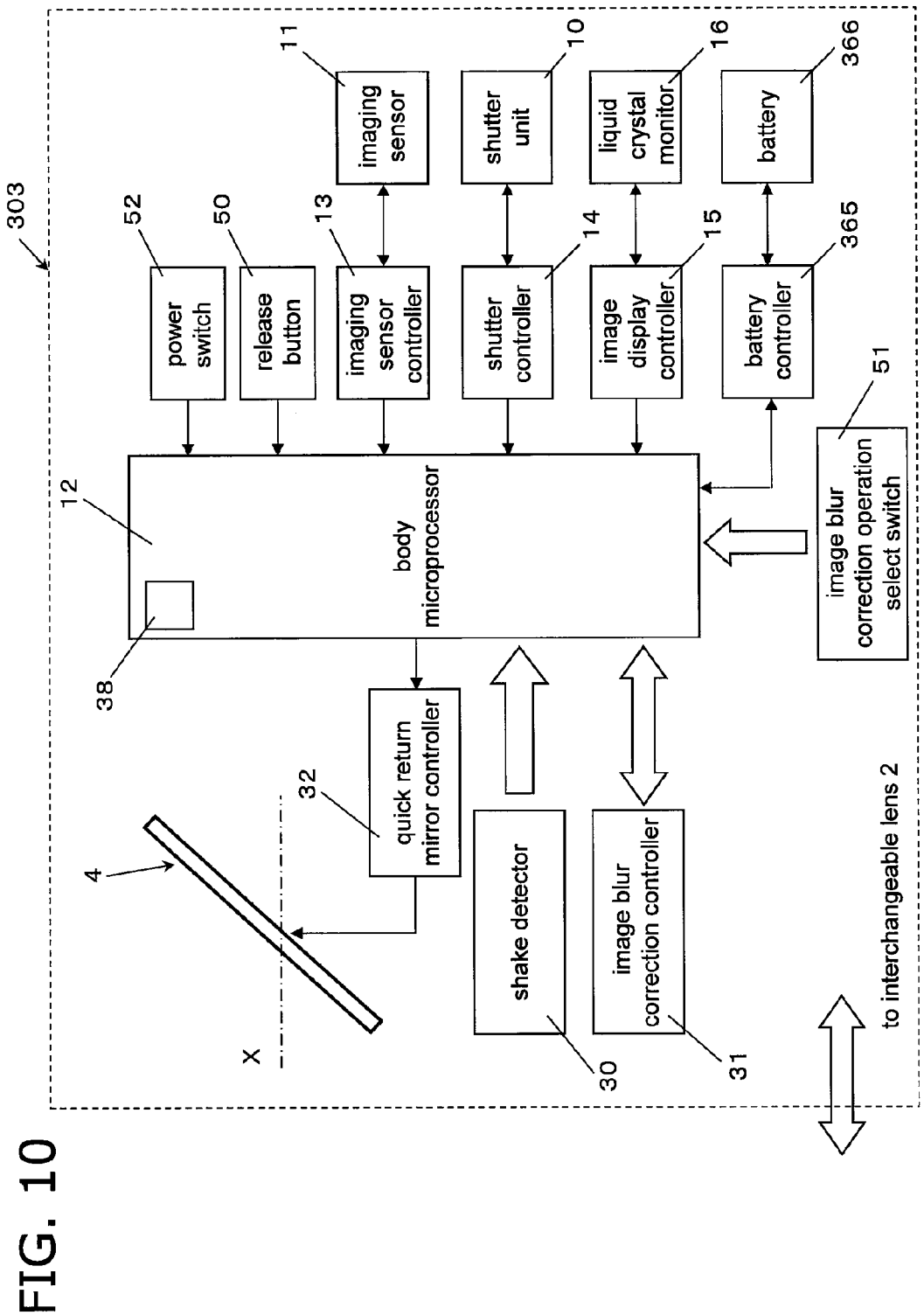
FIG. 10 is a block diagram of the control system inside a camera body pertaining to a fourth embodiment of the present invention.
Figure 11:
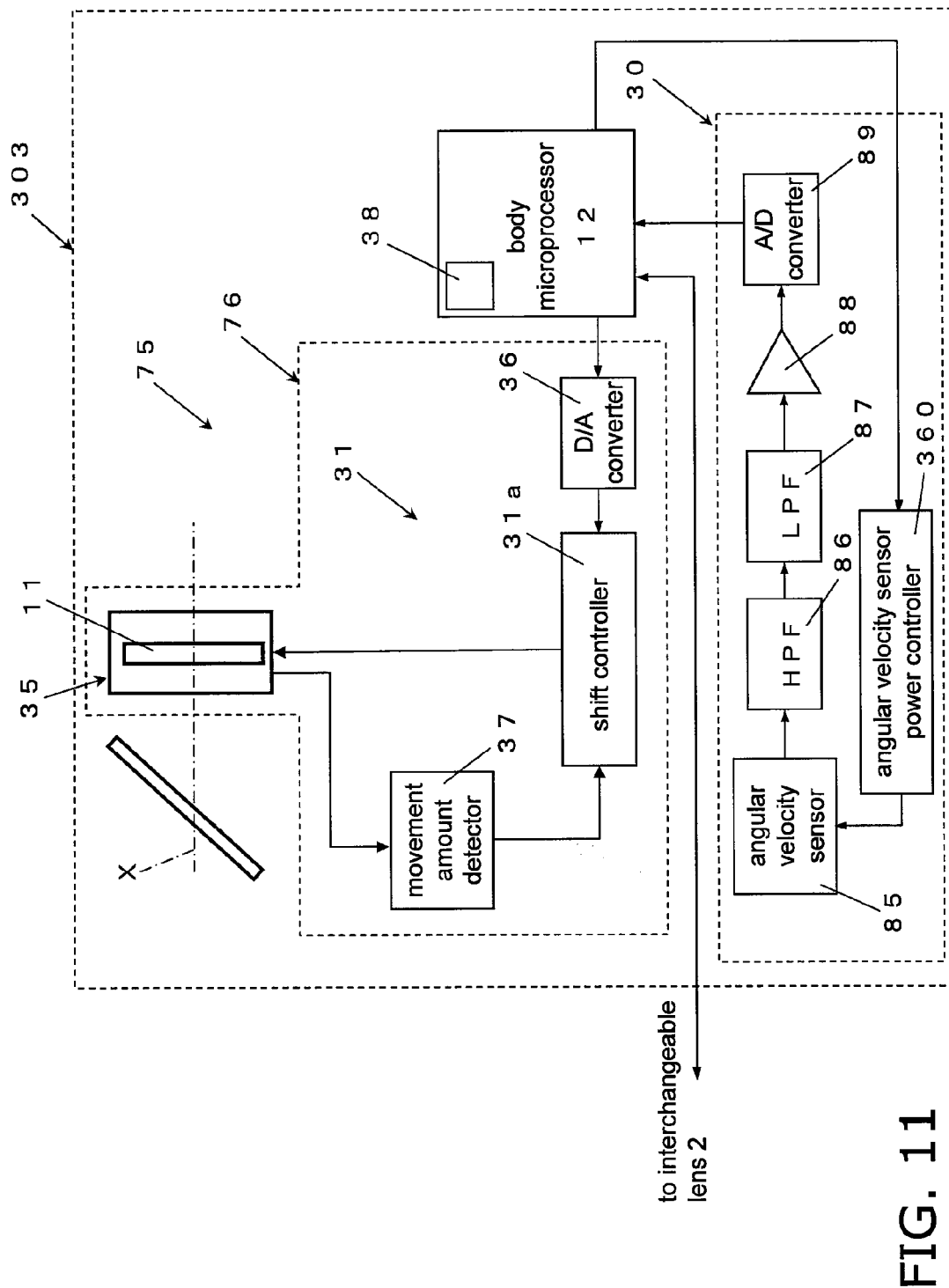
FIG. 11 is a block diagram of the hardware of an image blur corrector inside a camera body pertaining to the fourth embodiment of the present invention.
Figure 12:
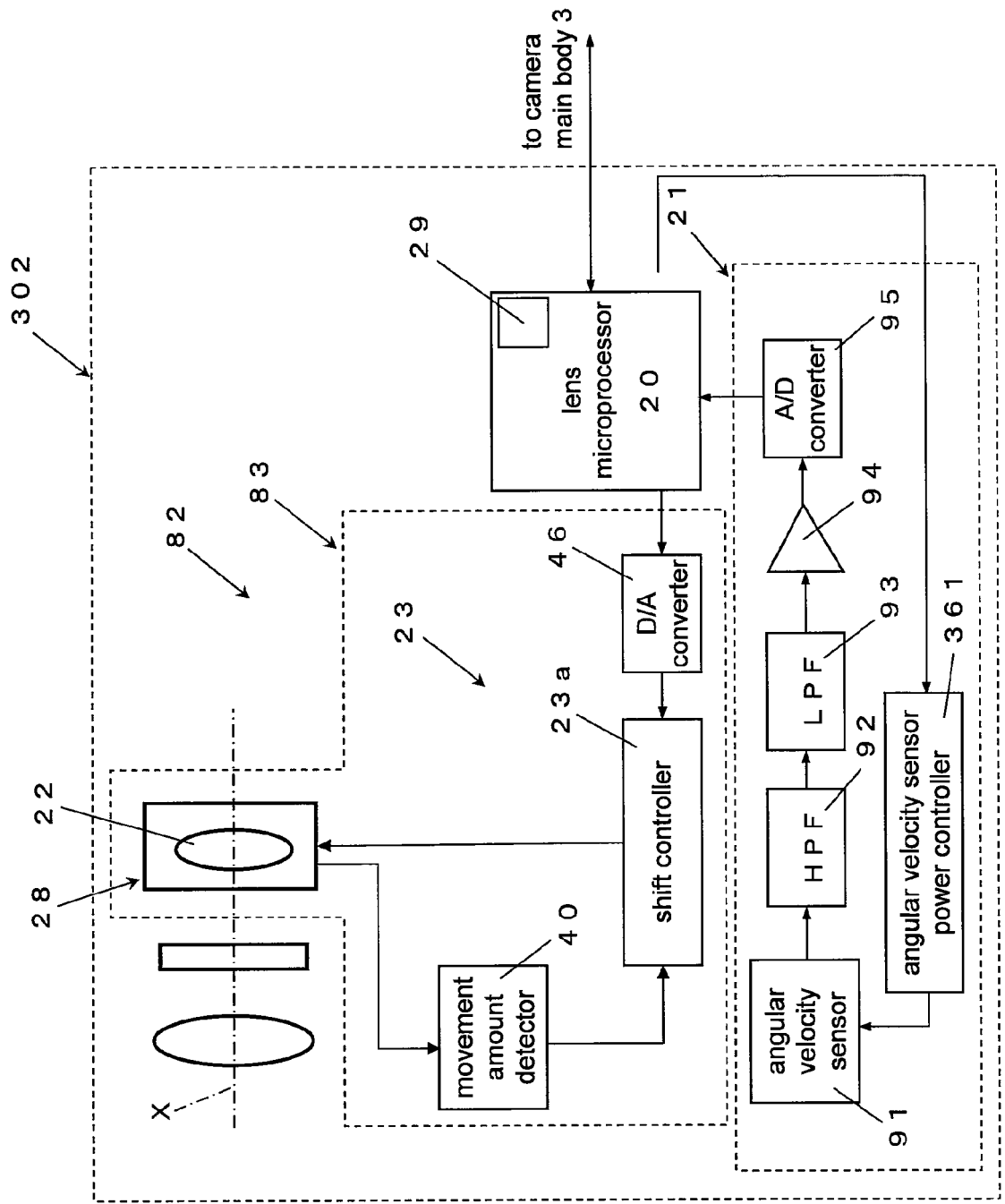
FIG. 12 is a block diagram of the hardware of an image blur corrector inside an interchangeable lens pertaining to the fourth embodiment of the present invention.
Figure 13:
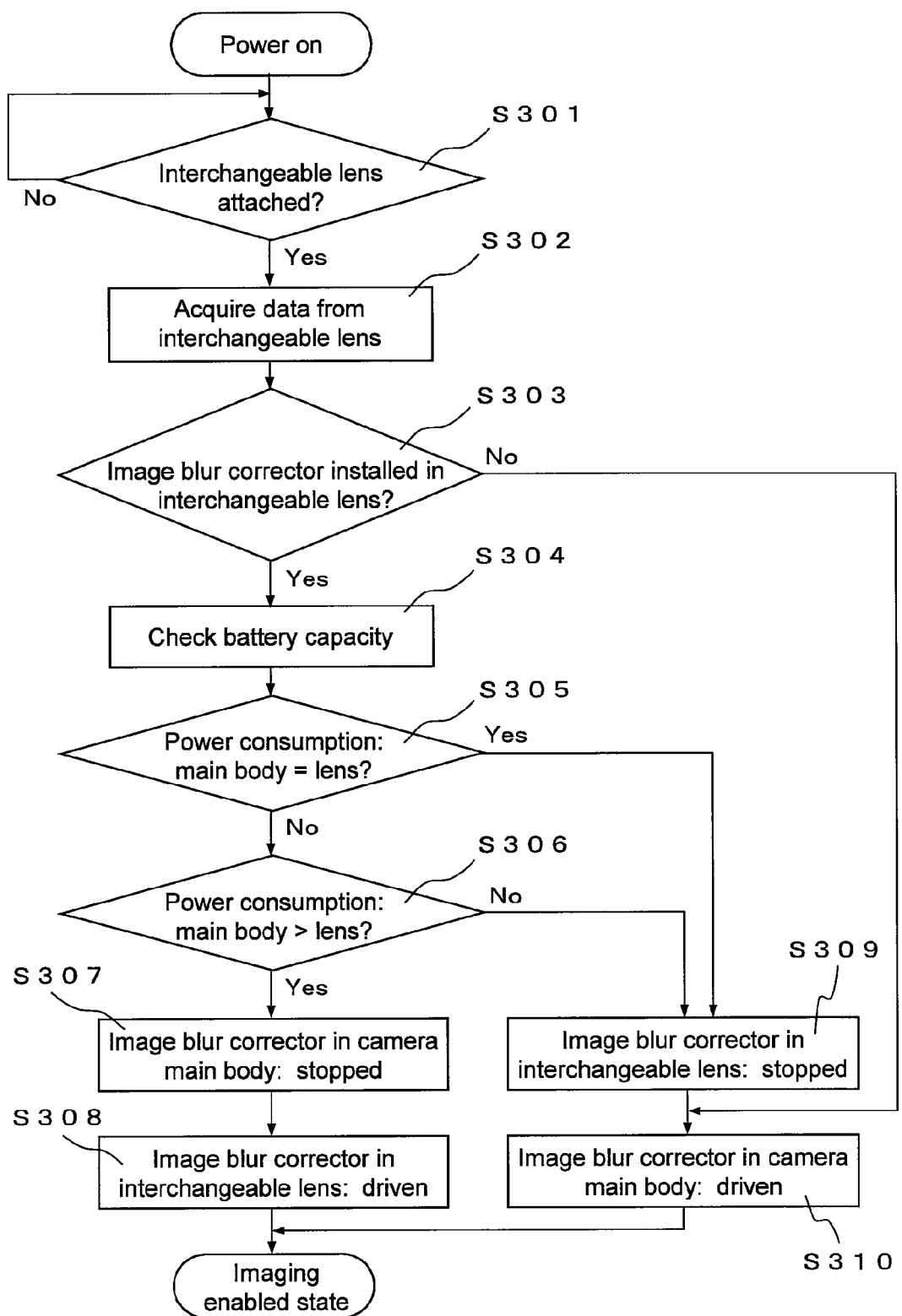
FIG. 13 is a flowchart illustrating the sequence related to the selecting operation of the image blur corrector pertaining to the fourth embodiment of the present invention.

In the third embodiment discussed above, the image blur corrector to be driven is determined on the basis of information related to optical performance, such as the maximum correctable angle. However, it is also conceivable that the image blur corrector will be determined on the basis of information other than that related to optical performance. A camera system pertaining to a fourth embodiment of the present invention will be described through reference to FIGS. 10 to 13. FIG. 10 is a block diagram of a camera body 303 pertaining to a third embodiment of the present invention, FIG. 11 is a block diagram of a body image blur corrector 375, FIG. 12 is a block diagram of lens image blur corrector 382, and FIG. 13 is a flowchart of the selecting operation of the image blur corrector pertaining to this embodiment. Those components that are the same as in the above embodiment are numbered the same and will not be described again.

As shown in FIG. 10, the camera body 303 of the camera system pertaining to this embodiment further has a battery 366 for storing electrical power, and a battery controller 365 for controlling the operation of the battery 366 and monitoring the remaining charge of the battery 366. As shown in FIG. 11, the body image blur corrector 375 further has an angular velocity sensor power controller 360 for switching the power on and off to the angular velocity sensor 85. As shown in FIG. 12, the lens image blur corrector 382 further has an angular velocity sensor power controller 361 for switching the power on and off to the angular velocity sensor 91.

The selecting operation sequence in this case will be described. As shown in FIG. 13, first the body microprocessor 12 determines whether or not the interchangeable lens 2 has been mounted on the camera body 3 (detection step: S301). If it is determined that the interchangeable lens 2 has been mounted, information about whether or not the image blur corrector 82 has been installed in the interchangeable lens 2 is acquired by the body microprocessor 12 from the memory component 29 in the interchangeable lens 2 (S302). Next, it is determined on the basis of this information whether or not the image blur corrector 82 has been installed in the interchangeable lens 2 (S303). If the image blur corrector 82 has been installed, the body microprocessor 12 checks the remaining charge of the battery 366 in the camera body 3 via the battery controller 365 (selection step: S304). At this point the body microprocessor 12 compares the lens-side power consumption included in the lens information with the body-side power consumption included in the body information (selection step: S305). If the power consumption levels are the same, then, for example, the lens image blur corrector 82 is stopped (S309) and the drive of the predetermined body image blur corrector 75 is commenced (S310). If the power consumption levels are different, the image blur corrector with the lower power consumption is selected (selection step: S306). The power consumption data may be stored ahead of time in the memory components 29 and 38, respectively. For example, if the image blur corrector 75 in the camera body 3 has higher power consumption, it will consume more of the power stored in the battery 366, and this means that the user cannot use the camera system 1 for as long. Therefore, in this case, the image blur corrector 82 in the interchangeable lens 2, which has lower power consumption, is automatically selected. Then, the image blur corrector 75 that was not selected is stopped (correction disabled setting step: S307), and drive of the image blur corrector 82 in the interchangeable lens 2 that was selected is commenced (correction enabled setting step: S308). If the image blur corrector 75 in the camera body 3 has lower power consumption, then the image blur corrector 75 is selected. Therefore, the image blur corrector 82 in the interchangeable lens 2 that was not selected is stopped (correction disabled setting step: S309), and the drive of the selected image blur corrector 75 is commenced. If the image blur corrector 82 has not been installed in the interchangeable lens 2, the image blur corrector 75 in the camera body 3 is automatically selected (S310).

As discussed above, with the camera system of this embodiment, only one of the image blur correctors is driven on the basis of the level of power consumption of the image blur corrector 75 in the camera body 3 and of the image blur corrector 82 in the interchangeable lens 2. As a result, even when an image blur corrector is installed in both the camera body 3 and the interchangeable lens 2, the image blur correctors can be operated properly, without inadvertent operation. Also, the consumption of power can be reduced because the image blur corrector is selected on the basis of power consumption.

Other Embodiments

The specific constitution of the present invention is not limited to or by the above embodiments, and various changes and modifications are possible without departing from the gist of the invention.

For example, automatic selection may be performed according to the photography situation, such as nighttime photography. For instance, the drive style of the image blur corrector may be motor drive or piezoelectric actuator drive, but a piezoelectric actuator is quieter. Therefore, in photography situations where the camera system needs to be quiet, such as when the photography mode is switched to silent mode, the constitution may be such that an image blur corrector driven by a piezoelectric actuator is selected. This allows the camera system to be quieter.

The constitution may also be such that the image blur corrector featuring the newer system is selected preferentially according to the model of the camera body 3 and the interchangeable lens 2 (information about the date of manufacture, model number, version, or firmware updates).

The constitution may also be such that the image blur corrector with the higher detection performance (such as sensitivity) of the shake detector is preferentially selected.

The constitution may also be such that automatic selection is performed according to the photography mode, that is, whether an image blur correction unit is always used or only operates when the release button has been pressed.

Also, the image blur correctors of both the interchangeable lens 2 and the camera body 3 can be used at the same time to increase the maximum correctable angle θ.

Also, when an angular velocity sensor is installed in only the interchangeable lens or the camera body, the constitution may be such that that one can be used automatically. If sensors are installed in both, the constitution may be such that one is selected automatically, or one can be selected as desired by the user, etc. Furthermore, the one that is newer, or the one with higher detection sensitivity, can be automatically selected according to information such as the date of manufacture of the shake detector.

Figure 14:
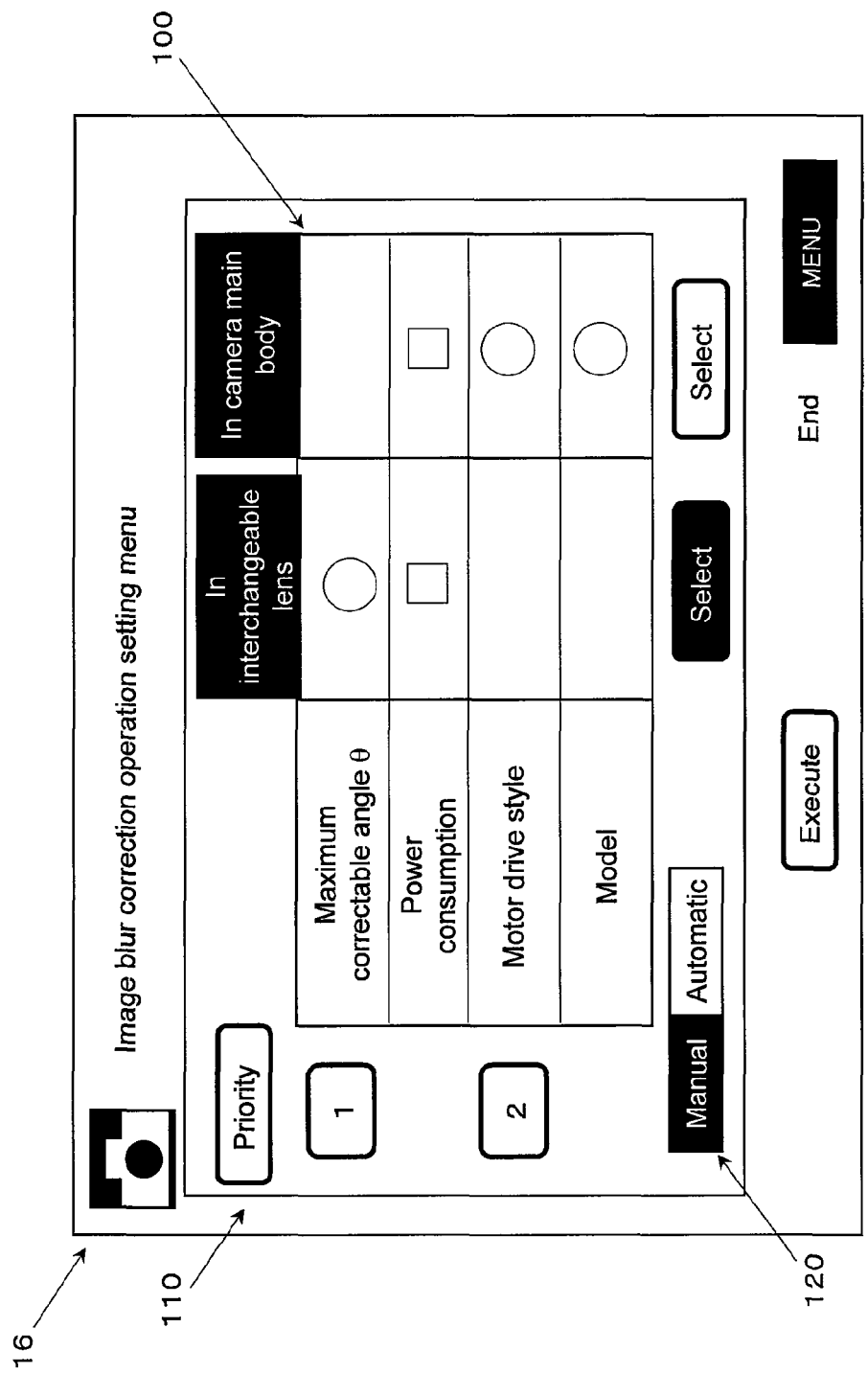
FIG. 14 is an example of a display screen showing an image blur correction setting menu.

Also, as shown in FIG. 14, another possible scenario is when the liquid crystal display 16 displays an image blur correction setting menu that allows the image blur corrector to be set. FIG. 14 shows an example of a display screen showing an image blur correction setting menu.

For example, when the image blur correctors 82 and 75 are installed in the interchangeable lens 2 and the camera body 3, a specification comparison table 100 for the image blur correctors 82 and 75 is displayed on the image blur correction setting menu screen. The user can select either of the image blur correctors while referring to this specification comparison table 100.

The types of specification listed in the specification comparison table 100 are "maximum correctable angle θ," "power consumption," and "motor drive style," and "in interchangeable lens" and "in camera body" are listed as the type of image blur corrector. The specification comparison table 100 also gives an evaluation of a specification for a specification category. As an example of how this is displayed, when the specification for one image blur corrector is superior to that of the other image blur corrector, a circle is displayed in the column for the superior specification. When the specifications are equivalent for both image blur correctors, a square is displayed in both columns.

For example, as shown in FIG. 14, when the image blur corrector 82 in the interchangeable lens 2 is superior to the image blur corrector 75 in the camera body 3 in terms of the maximum correctable angle θ, a circle is displayed under "in interchangeable lens" in the "maximum correctable angle" row.

If the image blur corrector 82 in the interchangeable lens 2 and the image blur corrector 75 in the camera body 3 are equivalent in terms of power consumption, a square is display under both "in interchangeable lens" and "in camera body" for the "power consumption" row.

Also, if the image blur corrector 75 in the camera body 3 is superior to the image blur corrector 82 in the interchangeable lens 2 in terms of motor drive style, then a circle is displayed under "in camera body" in the "motor drive style" row. The same applies to model.

Thus, the user can easily confirm form the specification comparison table 100 which of the image blur corrector is better. The user can manually select the image blur corrector best suited to the photography situation while referring to this specification comparison table 100. For example, as shown in FIG. 14, the user selects the image blur corrector 82 in the interchangeable lens 2, which has a better maximum correctable angle θ, and the execution of this processing is confirmed by the user. As a result, the correction operation is carried out by just the image blur corrector 82.

In addition to a case in which the user selects the image blur corrector manually, a case is also possible in which the image blur corrector is selected automatically. For example, as shown in FIG. 14, a priority display 110 is added to the categories related to specifications. In this case, the category whose priority is "1" is the maximum correctable angle θ, and the category whose priority is "2" is motor drive style.

When "automatic" is selected with the switch display 120, the image blur corrector having the better maximum correctable angle θ, which has been labeled priority 1, is automatically selected. As shown in FIG. 14, the image blur corrector 82 in the interchangeable lens 2 has the better maximum correctable angle θ. Therefore, in this case, the image blur corrector 82 is automatically selected, and the correction operation is carried out by just the image blur corrector 82.

When the categories whose priorities are "1" are equivalent between the interchangeable lens 2 and the camera body 3, the image blur corrector is automatically selected based on the category whose priority is "2". As shown in FIG. 14, the image blur corrector 75 in the camera body 3 has the better motor drive style. Therefore, in this case, the image blur corrector 75 is automatically selected, and the correction operation is carried out by just the image blur corrector 75.

In addition, the user can freely change the priority ordering.

INDUSTRIAL APPLICABILITY

The camera system, interchangeable lens, camera body, and camera system control method pertaining to the present invention are suitable for digital still cameras, digital video cameras, PDAs and mobile telephone terminals equipped with a camera function, and so forth that require interchangeability between an interchangeable lens and a camera body.

The invention claimed is:

1. A camera system for forming an image of a subject, comprising:
   an interchangeable lens having a lens image blur corrector configured to detect shake of the camera system and correct blurring of an image caused by this shake, and a lens controller configured to control the correcting operation of the lens image blur corrector, the lens controller holding lens information indicating at least one of specifications of the lens image blur corrector; and
   a camera body to which the interchangeable lens is removably attachable, the camera body having
      an imaging unit configured to form an image of the subject,
      a body image blur corrector configured to detect the shake and correct the blurring of the image,
      a body controller configured to control the imaging operation of the imaging unit and also control the correcting operation of the body image blur corrector, the body controller being capable of sending and receiving information to and from the lens controller, the body controller holding body information indicating at least one of specifications of the body image blur corrector, the body controller having a select component configured to select either the body image blur corrector or the lens image blur corrector, and a setting component configured to set the selected image blur corrector to a correction enabled state and set the other image blur corrector to a correction disabled state, and
a display component configured to display comparison information with which a user can compare the specifications of the body and lens image blur correctors,
the camera body or the interchangeable lens further having an image blur correction selector with which either the body or lens image blur corrector can be selected from the outside, and
the select component being configured to select either the body or lens image blur corrector on the basis of the selection state of the image blur correction selector.

2. The camera system according to claim 1, wherein the specifications of the body image blur corrector include a model of the camera body, and the specifications of the lens image blur corrector include a model of the interchangeable lens.

3. The camera system according to claim 1,
wherein the specifications of the body image blur corrector include a detection performance of the body image blur corrector, and
the specifications of the lens image blur corrector include a detection performance of the lens image blur corrector.

4. The camera system according to claim 1,
wherein the specifications of the body image blur corrector include a correction performance of the body image blur corrector, and
the specifications of the lens image blur corrector include a correction performance of the lens image blur corrector.

5. The camera system according to claim 1,
wherein the specifications of the body image blur corrector include a power consumption of the body image blur corrector, and
the specifications of the lens image blur corrector include a power consumption of the lens image blur corrector.

6. The camera system according to claim 1,
wherein the specifications of the body image blur corrector include a drive style of the body image blur corrector, and
the specifications of the lens image blur corrector include a drive style of the lens image blur corrector.

7. The camera system according to claim 1,
wherein the body controller further has a detect component configured to detect that the interchangeable lens has been mounted in the camera body, and
the select component selects either the body or lens image blur corrector on the basis of the selection state of the image blur correction selector after detection by the detect component.

8. The camera system according to claim 1,
wherein the camera body further has the image blur correction selector with which the activation and stopping of the body image blur corrector can be selected from the outside,
when activate has been selected by the image blur correction selector, the select component selects the body image blur corrector, and
when stop has been selected by the image blur correction selector, the select component selects the lens image blur corrector.

9. The camera system according to claim 1,
wherein the interchangeable lens further has the image blur correction selector with which the activation and stopping of the lens image blur corrector can be selected from the outside,
when activate has been selected by the image blur correction selector, the select component selects the lens image blur corrector, and
when stop has been selected by the image blur correction selector, the select component selects the body image blur corrector.

10. A camera body to which an interchangeable lens is removably attachable, used, along with the interchangeable lens, for a camera system configured to form an image of a subject, and having a lens image blur corrector configured to detect shake of the camera system and correct blurring of the image caused by the shake, and a lens controller configured to control the correcting operation of the lens image blur corrector and holding lens information indicating at least one of specifications of the lens image blur corrector, the camera body comprising:
an imaging unit configured to form an image of the subject;
a body image blur corrector configured to detect the shake and correcting blurring of the image;
a body controller configured to control the imaging operation of the imaging unit and also control the correcting operation of the body image blur corrector, the body controller holding body information indicating at least one of specifications of the body image blur corrector,
a display component configured to display comparison information with which a user can compare the specifications of the body and lens image blur correctors,
an image blur correction selector with which either the body or lens image blur corrector can be selected from the outside; and
a select component configured to select either the body or lens image blur corrector on the basis of the selection state of the image blur correction selector,
wherein the body controller is capable of sending and receiving information to and from the lens controller, and a setting component configured to set the selected image blur corrector to a correction enabled state on the basis of the selection state of the image blur correction selector.

11. A method for controlling a camera system for forming an image of a subject, the camera system comprising a camera body, having an imaging unit for forming an image of the subject, a body image blur corrector configured to detect shake of the camera system and correcting blurring of an image caused by the shake, and a body controller configured to control the imaging operation of the imaging unit and also controlling the correcting operation of the body image blur corrector; and an interchangeable lens that is removably attachable to the camera body, having a lens image blur corrector configured to detect the shake and correcting blurring of the image, and a lens controller configured to control the correcting operation of the lens image blur corrector, the body controller being capable of sending and receiving information to and from the lens controller, the body controller holding body information pertaining to the camera body, the lens controller holding lens information pertaining to the interchangeable lens, the body information including at least one of body specifications of the body image blur corrector, the lens information including at least one of lens specifications of the lens image blur corrector, the control method comprising:
displaying comparison information with which a user can compare the specifications of the body and lens image blur correctors on a display component;
selecting either the body or lens image blur corrector on the basis of a selection state of an image blur correction selector with which either the body or lens image blur corrector can be selected from the outside;

setting the image blur corrector selected in the selecting step to a correction enabled state by the body controller; and setting the other image blur corrector to a correction disabled state by the body controller.

* * * * *